United States Patent
Tarkin-Tas et al.

(10) Patent No.: US 12,180,337 B2
(45) Date of Patent: Dec. 31, 2024

(54) POLY (PHENYLENE ETHER) BASED COMPATIBILIZING MATERIAL

(71) Applicant: SHPP Global Technologies B.V., Bergen op Zoom (NL)

(72) Inventors: Eylem Tarkin-Tas, Delmar, NY (US); Huseyin Tas, Delmar, NY (US); Nikhil Verghese, Geleen (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 286 days.

(21) Appl. No.: 17/753,088

(22) PCT Filed: Aug. 20, 2020

(86) PCT No.: PCT/IB2020/057843
§ 371 (c)(1),
(2) Date: Feb. 18, 2022

(87) PCT Pub. No.: WO2021/033164
PCT Pub. Date: Feb. 25, 2021

(65) Prior Publication Data
US 2022/0275153 A1  Sep. 1, 2022

Related U.S. Application Data

(60) Provisional application No. 62/889,386, filed on Aug. 20, 2019.

(51) Int. Cl.
*C08G 65/48* (2006.01)
*C03C 25/32* (2018.01)

(52) U.S. Cl.
CPC ............ *C08G 65/485* (2013.01); *C03C 25/32* (2013.01); *C03C 2213/00* (2013.01); *C08G 2150/00* (2013.01)

(58) Field of Classification Search
None
See application file for complete search history.

(56) References Cited

U.S. PATENT DOCUMENTS

| | | | |
|---|---|---|---|
| 3,476,589 A | 11/1969 | Raphael et al. | |
| 4,659,753 A | 4/1987 | Tiburtius et al. | |
| 4,994,525 A * | 2/1991 | Brown | C08L 71/126 525/391 |
| 5,177,156 A | 1/1993 | Aritomi et al. | |
| 2007/0106050 A1* | 5/2007 | Sokolowski | C08G 65/485 528/86 |
| 2014/0044918 A1* | 2/2014 | Zeng | C08J 5/244 524/508 |
| 2016/0130406 A1 | 5/2016 | Hsieh et al. | |

FOREIGN PATENT DOCUMENTS

| | | |
|---|---|---|
| CA | 796700 | 10/1968 |
| CN | 102603215 | 7/2012 |
| DE | 19909219 A1 * | 9/2000 |
| EP | 0457351 | 11/1991 |
| EP | 2695916 | 2/2014 |
| JP | H05117505 | 5/1993 |
| JP | 2001089654 | 4/2001 |
| JP | 2002003714 | 1/2002 |
| JP | 3616565 B2 * | 2/2005 |
| JP | 4913970 B2 * | 4/2012 |
| WO | WO 2009/062137 | 5/2009 |
| WO | WO 2016/142786 | 9/2016 |

OTHER PUBLICATIONS

International Search Report in corresponding PCT Application No. PCT/IB2020/057843, mailed Oct. 30, 2020.
Miller, et al., "Impregnation techniques for thermoplastic matrix composites", *Polymers & Polymer Composites*, 4(7), 1996.

* cited by examiner

*Primary Examiner* — Tae H Yoon
(74) *Attorney, Agent, or Firm* — NORTON ROSE FULBRIGHT US LLP

(57) ABSTRACT

Compatibilizing materials for use with fibers and polymeric compositions are described. A compatibilizing material can include a silane (Si) modified polyphenylene ether (PPE) oligomer having a resin reactive functional group. The resin reactive functional group can be between the PPE moiety and a Si moiety. In other instances, the resin reactive functional group can be a substituent of the Si moiety.

16 Claims, No Drawings

POLY (PHENYLENE ETHER) BASED COMPATIBILIZING MATERIAL

CROSS-REFERENCE TO RELATED APPLICATIONS

This application is a national phase application under 35 U.S.C. § 371 of International Application No. PCT/IB2020/057843 filed Aug. 20, 2020, which claims the benefit of priority of U.S. Provisional Patent Application No. 62/889,386 filed Aug. 20, 2019, which are hereby incorporated by reference in their entirety.

BACKGROUND OF THE INVENTION

A. Field of the Invention

The invention generally concerns poly(phenylene ether) (PPE) based compatibilizing materials. In particular, the invention concerns a compatibilizing material that includes a silane (Si) modified PPE oligomer having a resin reactive functional group, where the resin reactive functional group is between the PPE moiety and the Si moiety or the resin reactive functional group is a substituent of the Si moiety.

B. Description of Related Art

Glass fiber, glass cloth and silica particles are used as reinforcing agents and inorganic fillers in polymeric composites materials to provide mechanical strength and heat resistance. In order to provide compatibility with the resin matrix of polymeric composite materials, surface treatment of these reinforcing agents or fillers is sometimes required. Sizing or coupling agents can be used in surface treatment processes. In addition, derivatives of PPE can be used as sizing agents. By way of example, U.S. Pat. No. 3,476,589 to Raphael et al. describes surface treating glass fibers with a quaternary ammonium halide derivative of a poly(phenylene ether). Chinese Patent No. CN201210072508 to Wang describes using non-derivatized PPE as a sizing agent for glass fibers. U.S. Pat. No. 5,177,156 to Aritomi et al. describes silane-modified PPE ethers comprised in a thermoplastic resin composition.

While various derivatized and derivatized PPE compounds are known, these compounds may be inefficient or ineffective at providing enhanced compatibility, adhesion, dielectric performance, and/or lower moisture absorption properties for the resulting composite materials.

SUMMARY OF THE INVENTION

A discovery has been made that provides a solution to at least some of the problems associated with PPE based compatibilizing materials. The discovery can include the use of a compatibilizing material that includes a silane modified PPE as a sizing agent for reinforcing agents or fillers (e.g., fibers). The compatibilizing material can include a silane (Si) modified polyphenylene ether (PPE) oligomer having a resin reactive functional group between the PPE moiety and a Si moiety or the resin reactive functional group is a substituent of the Si moiety or the PPE moiety. Without wishing to be bound by theory, it is believed that other substituents on the silane moiety or PPE moiety that are not resin reactive can couple to reinforcement materials such as fibers or fillers. The combination of coupling to the resin and reinforcement materials may provide improved dielectric performance, lower moisture absorption, adhesion to glass and/or functionalized metal, which can become part of the resin networks. These materials can be used for thermosetting materials such as prepregs, laminates, composites and the like.

In a particular aspect of the present invention, compatibilizing materials are described. A compatibilizing material can include a silane (Si) modified polyphenylene ether (PPE) oligomer having a resin reactive functional group. The resin reactive functional group can be between the PPE moiety and a Si moiety. In some embodiments, the resin reactive functional group can be a substituent of the Si moiety. In one embodiment, the compatibilizing material can have the structure:

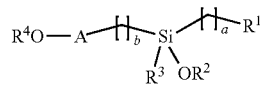

where A can be the polyphenylene ether oligomer, a can be 0 to 12, b is 0 to 12, $R^1$ can be a resin reactive group, $R^2$ can be a hydrogen (H), a substituted or unsubstituted hydrocarbyl group, $R^3$ can be a H, a substituted or unsubstituted hydrocarbyl group, or a substituted or unsubstituted alkoxy group, and $R^4$ can be H, a substituted hydrocarbyl group or an unsubstituted hydrocarbyl group. In some instances, $R^4$ can be a hydrogen, a substituted or unsubstituted aromatic group or $R^4$ can have the structure of:

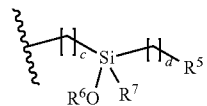

where c can be 0 to 12, d can be 0 to 12, $R^5$ can be a resin reactive group, $R^6$ can be a H, a substituted or unsubstituted hydrocarbyl group, and $R^7$ can be a H, a substituted or unsubstituted hydrocarbyl group, or a substituted or unsubstituted alkoxy group. In some embodiments, the compatibilizing material can have the structure:

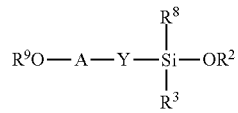

where A can be the polyphenylene ether oligomer, Y can be a linking group that includes a resin reactive functional group $R^{10}$, $R^2$ can be a H, a substituted or unsubstituted hydrocarbyl group, $R^3$ and $R^8$ can each independently be a H, a substituted or unsubstituted hydrocarbyl group, or a substituted or unsubstituted alkoxy group, and $R^9$ can be a H, or a substituted hydrocarbyl group, or an unsubstituted hydrocarbyl group. $R^9$ can be a H, a substituted aromatic group, or an unsubstituted aromatic group, or $R^9$ has the structure of:

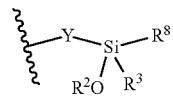

where Y can be the linking group that includes the resin reactive functional group $R^{10}$, $R^2$ can be a H, a substituted or unsubstituted hydrocarbyl group, and $R^3$ and $R^8$ can each independently be a H, a substituted or unsubstituted hydrocarbyl group, or a substituted or unsubstituted alkoxy group. In such a structure, Y can have one of the following structures:

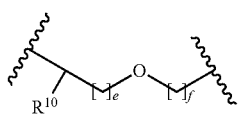

where $R^{10}$ can be the resin reactive group, e can be from 0 to 12, f can be from 0 to 12, and

represents the bonds to A and Si with the proviso that when $R^9$ is H, $R^{10}$ is not OH;

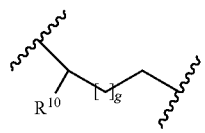

where $R^{10}$ can be the resin reactive group, g can be from 0 to 12, and

represents the bonds to A and Si; or

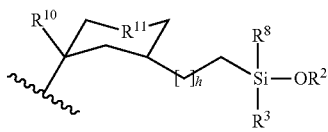

where $R^{10}$ can be the resin reactive group, h can be from 0 to 12, $R^{11}$ can be a bond, or a substituted or unsubstituted hydrocarbyl group, and

represents the bond to A. In some embodiments, the resin reactive group can include an epoxy group, a substituted epoxy group, an olefin-containing group, a substituted olefin-containing group, an acrylate group, a substituted acrylate group, a cyano group, a substituted cyano group, a hydroxy group, or any combination thereof, preferably a hydroxy group, an acrylate group or substituted acrylate group, more preferably a methacrylate group, a vinyl group or a hydroxy group. In a particular aspect, A can include poly(2,6-dimethyl-4-phenylene ether). For example, A can be represented by the structure:

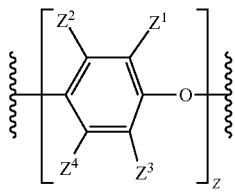

where $Z^1$, $Z^2$, $Z^3$, and $Z^4$ can each independently be a hydrogen, a phenyl, a (bi)cyclic hydrocarbon, a unsubstituted or a substituted $C_1$-$C_{12}$ hydrocarbyl group, a C5-C12 cyclohydrocarbyl group, an allyl group provided that the hydrocarbyl group is not a tertiary hydrocarbyl, a $C_1$-$C_{12}$ hydrocarbylthio, a $C_1$-$C_{12}$ hydrocarbyloxy, or a $C_2$-$C_{12}$ halohydrocarbyloxy with at least two carbon atoms separating the halogen and oxygen atoms, and z can be at least 1; preferably $Z^2$ and $Z^4$ can be methyl, phenyl or a combination thereof, more preferably $Z^2$ is methyl and $Z^4$ is phenyl. A can also be represented by the structure:

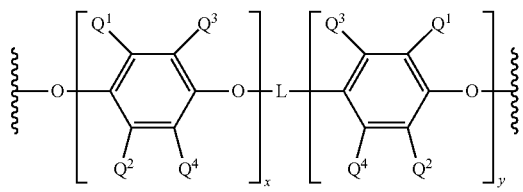

where $Q^1$, $Q^2$, $Q^3$, and $Q^4$ can each independently be a hydrogen, an unsubstituted or substituted $C_1$-$C_{12}$ primary or secondary hydrocarbyl, $C_5$-$C_{12}$ cyclohydrocarbyl group, a $C_1$-$C_{12}$ hydrocarbylthio, a $C_1$-$C_{12}$ hydrocarbyloxy, and a $C_2$-$C_{12}$ halohydrocarbyloxy where at least two carbon atoms separate the halogen and oxygen atoms; x and y can each independently be 0 to 30, provided that the sum of x and y is at least 2, preferably $Q^1$ and $Q^2$ can be methyl, phenyl, or a combination thereof, more preferably $Q^1$ can be methyl and $Q^2$ phenyl, and L can have the structure:

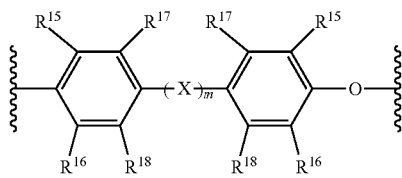

where $R^{15}$, $R^{16}$, $R^{17}$, and $R^{18}$ can each independently be a hydrogen, an unsubstituted or substituted $C_1$-$C_{12}$ hydrocarbyl provided that the hydrocarbyl group is not a tertiary hydrocarbyl, a $C_1$-$C_{12}$ hydrocarbylthio, a $C_1$-$C_{12}$ hydrocarbyloxy, and a $C_2$-$C_{12}$ halohydrocarbyloxy with at least two carbon atoms separating the halogen and oxygen atoms, m can be 0 or 1; and X can have a structure:

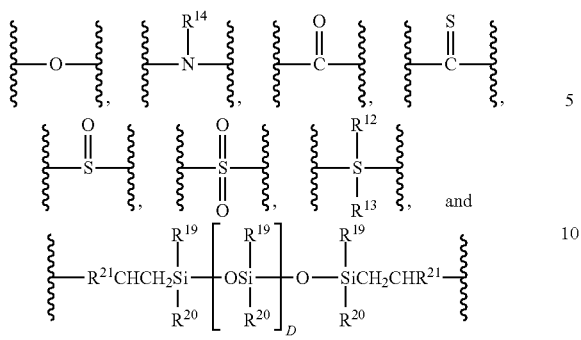

where $R^{14}$ can be a hydrogen or $C_1$-$C_{12}$ hydrocarbyl, $R^{12}$ and $R^{13}$ can each independently be a hydrogen, a $C_1$-$C_{12}$ hydrocarbyl, or $C_1$-$C_6$ hydrocarbylene where $R^{12}$ and $R^{13}$ collectively can form a $C_4$-$C_{12}$ alkene, or a siloxane where $R^{19}$ and $R^{20}$ can each be independently selected from hydrogen, hydrocarbyl or halogen-substituted hydrocarbyl, $R^{21}$ can be a hydrocarbyl or substituted hydrocarbyl, D can be an integer of from about 30 to about 70, preferably $R^{19}$ and $R^{20}$ are both methyl and D is 10 to 60, and at least one of $R^{15}$-$R^{18}$ is methoxy. In some embodiments, X can have the structure:

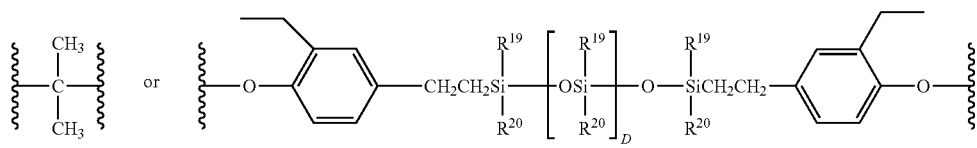

Non-limiting examples of A can include

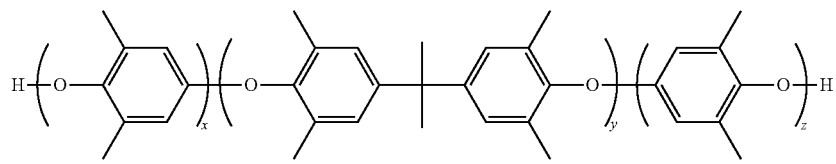

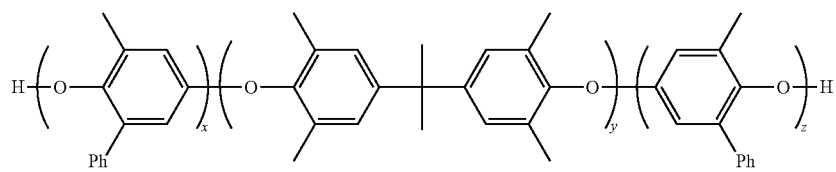

where x and, z 0 to 40, and y=1.

In some embodiments, the compatibilizing material can have the structure of

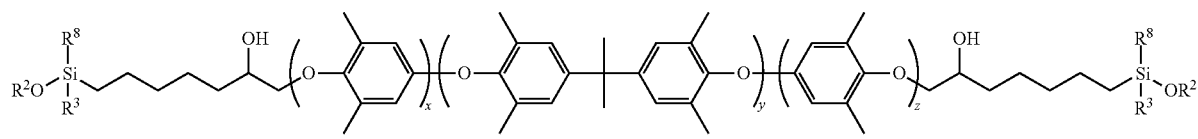

where x and, z can be independently 0 to 40, y can be 0 or 1, wherein when y is 0, at least one of x and z is 1 to 40, $R^2$ can be a H, a substituted or unsubstituted hydrocarbyl group, and $R^3$ and $R^8$ can each independently be a H, a substituted or unsubstituted hydrocarbyl group, or a substituted or unsubstituted alkoxy group.

In some embodiments, the compatibilizing material can have the structure of

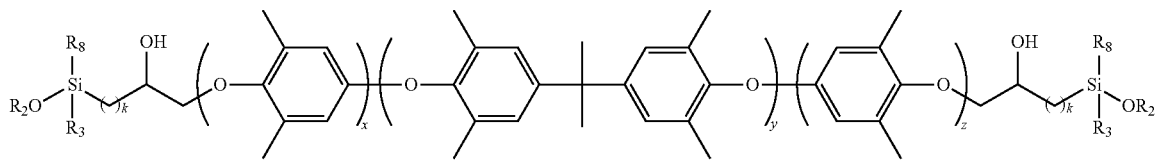

where k can be 1 to 10, x and, z can be independently 0 to 40, y can be 0 or 1, wherein when y is 0, at least one of x and z is 1 to 40, $R^2$ can be a H, a substituted or unsubstituted hydrocarbyl group, and $R^3$ and $R^8$ can each independently be a H, a substituted or unsubstituted hydrocarbyl group, or a substituted or unsubstituted alkoxy group.

In some embodiments, the compatibilizing material can have the structure of

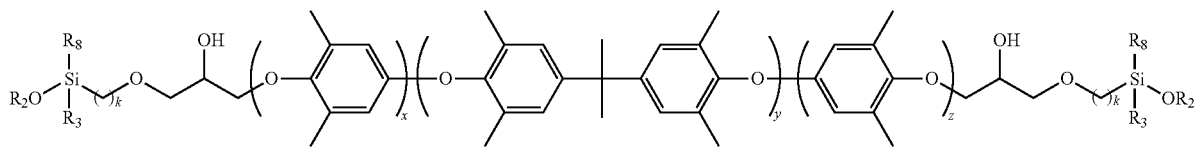

where k can be 1 to 10, x and, z can be independently 0 to 40, R2 can be a H, a substituted or unsubstituted hydrocarbyl group, and R3 and R8 can each independently be a H, a substituted or unsubstituted hydrocarbyl group, or a substituted or unsubstituted alkoxy group.

In some aspects, the compatibilizing material can have the structure of:

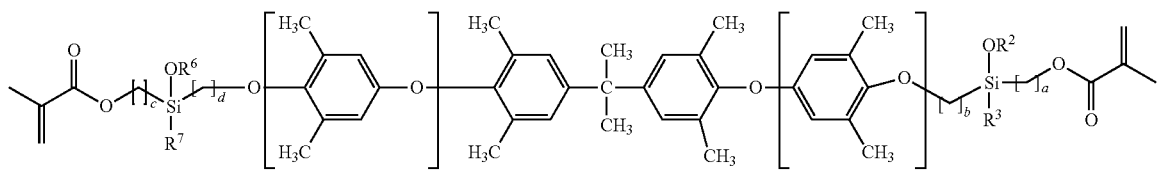

where: a and c are each independently 0 to 12; b and d are each independently 0 to 12; and $R^2$ and $R^6$ are each independently a H, a substituted or unsubstituted hydrocarbyl group; $R^3$ and $R^7$ are each independently a H, a substituted or unsubstituted hydrocarbyl group, or a substituted or unsubstituted alkoxy group; and x and y are independently 0 to 30, provided that the sum of x and y is at least 2.

In another aspect, the compatibilizing material can have the structure of:

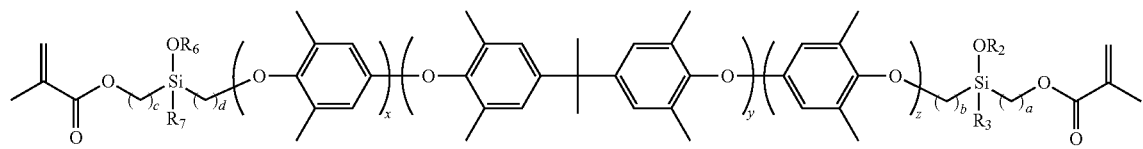

where a and c can each independently be 0 to 12, b and d can each independently be 0 to 12, and $R^2$ and $R^6$ can each independently be a H, a substituted or unsubstituted hydrocarbyl group, $R^3$ and $R^7$ can each independently be a H, a substituted or unsubstituted hydrocarbyl group, or a substituted or unsubstituted alkoxy group, x and z can each independently be 0 to 30, provided that the sum of x and z is at least 2, and y can be 0 or 1.

In another aspect, the compatibilizing material can have the structure of:

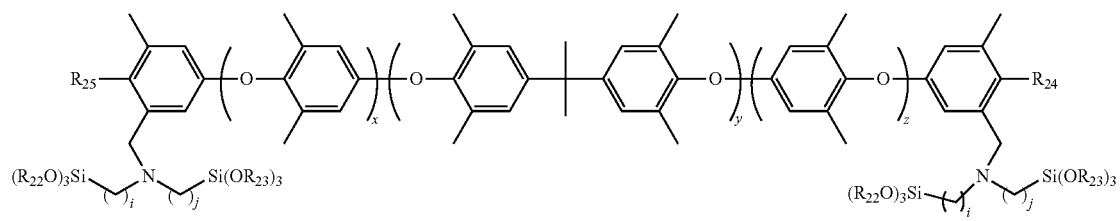

where $R^{22}$ and $R^{23}$ can each independently be a hydrocarbyl or substituted hydrocarbyl group, preferably methyl or ethyl groups, $R^{24}$ and $R^{25}$ can each independently be an epoxy group, a substituted epoxy group, an olefin-containing group, a substituted olefin-containing group, an acrylate group, a substituted acrylate group, a cyano group, a substituted cyano group, a cyanate group a hydroxy group, or any combination thereof, preferably a hydroxy group, an acrylate group or substituted acrylate group, more preferably a methacrylate group, a vinyl group or a hydroxy group, i is 0 to 6 and j is 0 to 6, x and z are independently 0 to 30, provided that the sum of x and z is at least 2 and y can be 0 or 1.

In some aspects, the compatibilizing material can have the structure of:

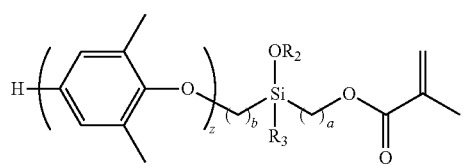

where, and $R^2$ can be a H, a substituted or unsubstituted hydrocarbyl group, $R^3$ can be a H, a substituted or unsubstituted hydrocarbyl group, or a substituted or unsubstituted alkoxy group, a can be 0 to 12, b can be 0 to 12, and z can be 1 to 30.

In some aspects, the compatibilizing material can have the structure of:

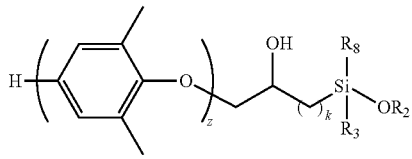

where k can be 1 to 10, z can be 1 to 40, $R^2$ can be a H, a substituted or unsubstituted hydrocarbyl group, and $R^3$ and $R^8$ can each independently be a H, a substituted or unsubstituted hydrocarbyl group, or a substituted or unsubstituted alkoxy group.

In some aspects, the compatibilizing material can have the structure of:

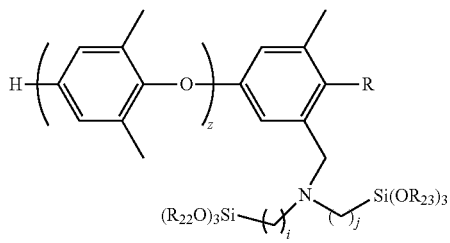

where $R^{22}$ and $R^{23}$ can each independently be a hydrocarbyl or substituted hydrocarbyl group, preferably methyl or ethyl groups, R can be an epoxy group, a substituted epoxy group, an olefin-containing group, a substituted olefin-containing group, an acrylate group, a substituted acrylate group, a cyano group, a substituted cyano group, a cyanate group a hydroxy group, or any combination thereof, preferably a hydroxy group, an acrylate group or substituted acrylate group, more preferably a methacrylate group, a vinyl group or a hydroxy group, i is 0 to 6 and j is 0 to 6, z can be 1 to 30.

In some embodiments, methods of preparing silane functionalized PPEs are described. A method can include subjection a composition comprising a PPE oligomer, a silane source, and 4-dimethylaminopyridine to conditions sufficient to react the PPE oligomer with the silane source to produce a silane modified PPE. The conditions can include a temperature of 80° C. to 100° C. or any temperature there between. The amount of silane source to PPE oligomer can be adjusted to produce mono- or bifunctional silanated PPE (e.g., 0.5 moles to 2 moles of silane can be used).

In some aspects, 2,6-dimethyl phenol and a silane source can be contacted under conditions sufficient to react 2,6-dimethyl phenol with the silane source to produce a silane modified PPE. The 2,6-dimethyl phenol and the silane source can oxidatively couple to produce the silane modified PPE.

In another aspect of the present invention describes sized fibers that include the compatibilizing material of the present invention. The sized fibers can be included in a polymeric composition that includes a polymeric resin and optional additives. At least a portion of the compatibilizing material can be attached to the polymeric resin and can be attached to the fiber. The compatibilizing material can be covalently bonded to the polymeric resin and be coated on at least a portion of the surface of the fiber. In a preferred instance, the fiber can be an inorganic fiber or filler, more preferably glass fibers, glass cloth, or both. The resin can include a thermoset polymer, a thermoplastic polymer, a fire-retardant resin composition, or any combination thereof, preferably the thermoset polymer is an epoxy resin, an epoxy vinylester, an alkyd, an amino-based polymers a diallyl phthalate, a phenolics polymer or resin, a polyester, an unsaturated polyester resin, a dicyclopentadiene, a polyimide, a silicon, a cyanate esters of polycyanurate, a thermosetting polyacrylic resin, a benzoxazine, or co-polymers thereof, or blends thereof. Polymers derived from triallyl cyanurate, triallyl isocyanurate, mono or multifunctional vinyl monomers. In some embodiments, triallyl cyanurate, triallyl isocyanurate, mono or multifunctional vinyl monomers are used. In some instance, the sized fiber can be included in a laminate. The compatibilizing materials described herein can be used for surface treatment and/or coating of various materials. The materials can be a sheet, foil, fiber, film and/or filler. The material can be glass such as glass fiber, alumina fiber, basalt fiber, quartz fiber, inorganic filler, or metal foil (e.g. Cu foil). Certain aspects are directed to a material that is surface treated (e.g. a surface of the material is treated and/or coated) with the compatibilizing material described herein. The material can include but is not limited to glass such as glass fiber, alumina fiber, basalt fiber, quartz fiber, inorganic filler such as silica or metal foil such as copper foil. Certain aspects are directed to a surface treated material and/or coated material containing a compatibilizing material described herein. The surface treated and/or coated material can include but are not limited to glass such as glass fiber, alumina fiber, basalt fiber, quartz fiber, inorganic filler such as silica or metal foil such as copper foil. Certain aspects are directed to a thermosetting resin composition containing the surface treated material and/or coated material described herein. Certain aspects are directed to a thermosetting resin composition containing a compatibilizing material described herein and a glass fiber, alumina fiber, basalt fiber, quartz fiber, inorganic filler or metal foil.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment or aspect discussed herein can be combined with other embodiments or aspects discussed herein and/or implemented with respect to any method or composition of the invention, and vice versa. Furthermore, compositions of the invention can be used to achieve methods of the invention.

The following includes definitions of various terms and phrases used throughout this specification.

The term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated (aliphatic), divalent hydrocarbon group (e.g., methylene (—$CH_2$—) or propylene (—$(CH_2)_3$—)). "Alkenyl" and "alkenylene" mean a monovalent or divalent, respectively, straight or branched chain hydrocarbon group having at least one carbon-carbon double bond (e.g., ethenyl (—HC=$CH_2$). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy. "Cycloalkyl" and "cycloalkylene" mean a monovalent and divalent cyclic hydrocarbon group, respectively, of the formula —$C_nH_{2n}$— and —$C_nH_{2n-2x}$— wherein x is the number of cyclizations. "Aryl" means a monovalent, monocyclic, or polycyclic aromatic group (e.g., phenyl or naphthyl). "Arylene" means a divalent, monocyclic, or polycyclic aromatic group. "Alkylarylene" means an arylene group substituted with an alkyl group. "Arylalkylene" means an alkylene group substituted with an aryl group (e.g., benzyl). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—$NO_2$), cyano (—CN), hydroxy (—OH), thiol (—SH), thiocyano (—SCN), $C_{1-6}$ alkyl, $C_{2-6}$ alkenyl, $C_{2-6}$ alkynyl, $C_{1-6}$, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g., benzyl), $C_{7-12}$ alkylarylene (e.g., toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), derivatized Si provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of any substituents.

"Resin reactive functional group" refers to a substituent that can react with a substituent on a resin. Non-limiting examples of resin reactive functional groups include an epoxy group, a substituted epoxy group, an olefin-containing group, a substituted olefin-containing group, an acrylate group, a substituted acrylate group, a cyano group, a substituted cyano group, a hydroxy group, or any combination thereof, preferably a hydroxy group, an acrylate group or substituted acrylate group, more preferably a methacrylate group, a vinyl group or a hydroxy group.

"Oligomer" refers to a polymer with a limited number of repeating units (e.g., 1, 2, 3, 4, or 5). In the context of the present invention an oligomer has molecular weight of 500 to 5000 g/mol and is mono or bifunctional.

In the structural drawings, a wavy line (e.g.,

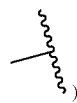

means the portion of the structure beyond this point is unspecified unless indicated otherwise.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or a molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compatibilizing materials of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the compatibilizing materials is that they can improve compatibility between inorganic fillers or fibers and may improve adhesion to inorganic fillers and metal, dielectric properties of polymeric materials, flame retardancy of polymeric materials, and reduce moisture adsorption of polymeric materials.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DETAILED DESCRIPTION OF THE INVENTION

A discovery has been made that provides a solution to at least some of the problems associated with PPE based compatibilizing materials. The discovery can include the use of a compatibilizing material that includes a silane modified PPE. The compatibilizing material can include a silane (Si) modified polyphenylene ether (PPE) oligomer having a resin reactive functional group between the PPE moiety and a Si moiety or the resin reactive functional group is a substituent of the Si moiety or the PPE moiety. In one aspect, the compatibilizing material can be used as a sizing agent for fibers to produce sized fibers. The sized fibers can be used in composite materials that includes a polymeric matrix.

These and other non-limiting aspects of the present invention are discussed in further detail in the following sections.

A. Si Modified PPE Compatibilizing Material

The silane modified PPE compounds of the present invention can include a resin reactive functional group. Non-limiting examples of resin reactive groups include an epoxy group, a substituted epoxy group, an olefin-containing group, a substituted olefin-containing group, an acrylate group, a substituted acrylate group, a cyano group, a substituted cyano group, a hydroxy group, or any combination thereof. In some embodiments, the resin reactive group can be a hydroxy group, an acrylate group, substituted acrylate group, or a siloxane. In a preferred embodiments, the resin reactive group is a methacrylate group, or a vinyl group.

PPEs of the present invention can represented by the structure:

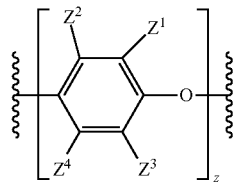

where $Z^1$, $Z^2$, $Z^3$, and $Z^4$ can each independently be a hydrogen, a unsubstituted or a substituted $C_1$-$C_{12}$ hydrocarbyl group provided that the hydrocarbyl group is not a tertiary hydrocarbyl, a $C_1$-$C_{12}$ hydrocarbylthio, a $C_1$-$C_{12}$ hydrocarbyloxy, or a $C_2$-$C_{12}$ halohydrocarbyloxy with at least two carbon atoms separating the halogen and oxygen atoms, and z is at least 1.

In some embodiments, the PPE can be represented by the structure:

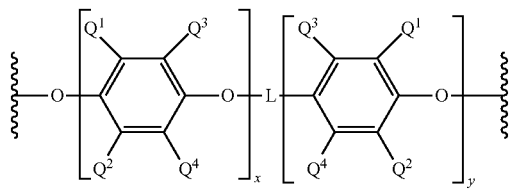

where $Q^1$, $Q^2$, $Q^3$, and $Q^4$ can each independently be a hydrogen, an unsubstituted or substituted $C_1$-$C_{12}$ primary or secondary hydrocarbyl, a $C_1$-$C_{12}$ hydrocarbylthio, a $C_1$-$C_{12}$ hydrocarbyloxy, and a $C_2$-$C_{12}$ halohydrocarbyloxy where at least two carbon atoms separate the halogen and oxygen atoms; x and y are independently 0 to 30, provided that the sum of x and y is at least 2; and L has the structure:

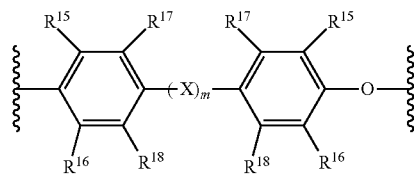

where $R^{15}$, $R^{16}$, $R^{17}$, and $R^{18}$ can each independently be a hydrogen, an unsubstituted or substituted $C_1$-$C_{12}$ hydrocarbyl provided that the hydrocarbyl group is not a tertiary hydrocarbyl, a $C_1$-$C_{12}$ hydrocarbylthio, a $C_1$-$C_{12}$ hydrocarbyloxy, and a $C_2$-$C_{12}$ halohydrocarbyloxy with at least two carbon atoms separating the halogen and oxygen atoms; m is 0 or 1; and X has a structure:

and X can have a structure selected from:

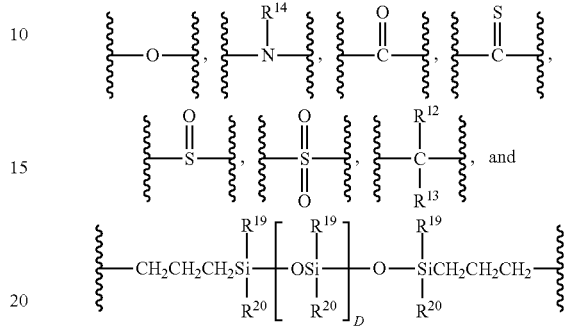

where $R^{14}$ can be a hydrogen or $C_1$-$C_{12}$ hydrocarbyl, $R^{12}$ and $R^{13}$ can each independently be a hydrogen, a $C_1$-$C_{12}$ hydrocarbyl, or $C_1$-$C_6$ hydrocarbylene where $R^{12}$ and $R^{13}$ collectively can form a $C_4$-$C_{12}$ alkene, a or a siloxane where $R^{19}$ and $R^{20}$ are each independently selected from hydrogen, hydrocarbyl or halogen-substituted hydrocarbyl, D is an integer of from about 30 to about 70, preferably $R^{19}$ and $R^{20}$ are both methyl and D is 40 to 60, and at least one of $R^{15}$-$R^{18}$ is methoxy.

In some embodiments, the PPE can have the structure:

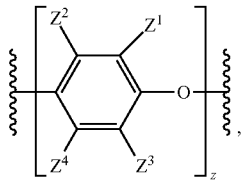

where $Z^1$, $Z^2$, $Z^3$, and $Z^4$ can each independently be a hydrogen, a unsubstituted or a substituted $C_1$-$C_{12}$ hydrocarbyl group provided that the hydrocarbyl group is not a tertiary hydrocarbyl, a $C_1$-$C_{12}$ hydrocarbylthio, a $C_1$-$C_{12}$ hydrocarbyloxy, or a $C_2$-$C_{12}$ halohydrocarbyloxy with at least two carbon atoms separating the halogen, and oxygen atoms, preferably $Z^1$ and $Z^3$ are methyl and $Z^2$ and $Z^4$ are H, and z is at least 1.

In yet another embodiment, the PPE can have the structure of

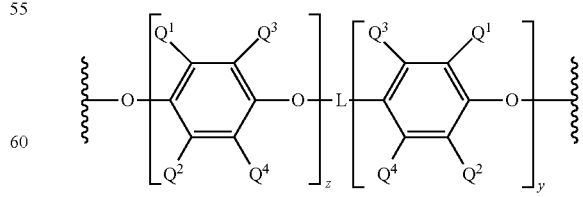

where $Q^1$, $Q^2$, $Q^3$, and $Q^4$ can each independently be a halogen, an unsubstituted or substituted $C_1$-$C_{12}$ primary or secondary hydrocarbyl, a $C_1$-$C_{12}$ hydrocarbylthio, a $C_1$-$C_{12}$ hydrocarbyloxy, and a $C_2$-$C_{12}$ halohydrocarbyloxy where at least two carbon atoms separate the halogen and oxygen atoms, x and y can each independently be 0 to 30, provided that the sum of x and y is at least 2, and L can have the structure:

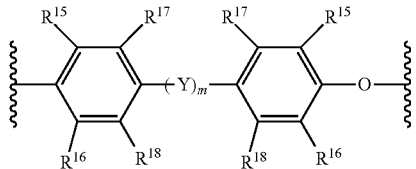

where $R^{15}$ and $R^{16}$ can each be methyl groups, $R^{17}$, and $R^{18}$ can each be hydrogen; m can be 0 or 1; and Y can be:

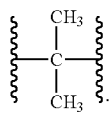

The PPE's of the present invention can be bonded to one or more silane groups that includes the reactive resin functional group and/or a linker group that includes the reactive resin functional group. In one aspect the silane modified PPE can have the general structure of:

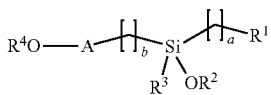

where A can be a polyphenylene ether moiety described above. This silane portion can have a be 0 to 12, and b can be 0 to 12. $R^1$ can be the resin reactive group. Non-limiting examples of resin reactive groups include an epoxy group, a substituted epoxy group, an olefin-containing group, a substituted olefin-containing group, an acrylate group, a substituted acrylate group, a cyano group, a substituted cyano group, a hydroxy group, or any combination thereof. In some embodiments, the resin reactive group can be a hydroxy group, an acrylate group or substituted acrylate group. In a one embodiment, the resin reactive group is a methacrylate group or an acrylate group. $R^2$ can be a H, a substituted hydrocarbyl group, or unsubstituted hydrocarbyl group. Non-limiting examples of $R^2$ include methyl, ethyl, and propyl. $R^3$ can be a H, a substituted hydrocarbyl group, an unsubstituted hydrocarbyl group, a substituted alkoxy group, or an unsubstituted alkoxy group. Non-limiting examples of $R^3$ include methoxy and ethoxy. $R^4$ can be a H, or a substituted or unsubstituted hydrocarbyl group. In some embodiments, $R^4$ can be a substituted or unsubstituted aromatic group. In other embodiments, $R^4$ can have the structure of:

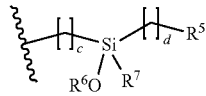

where c can be 0 to 12, and d can be 0 to 12. $R^5$ can be a resin reactive group that is the same or different than $R^1$. In one instance $R^5$ and $R^1$ are the same. $R^6$ can be a H or a substituted or unsubstituted hydrocarbyl group. Non-limiting examples of $R^6$ include methyl, ethyl, and propyl. $R^7$ can be a H, a substituted or unsubstituted hydrocarbyl group, or a substituted or unsubstituted alkoxy group. Non-limiting examples of $R^7$ include methoxy and ethoxy. In one instance, the silane modified PPE can include the following structure:

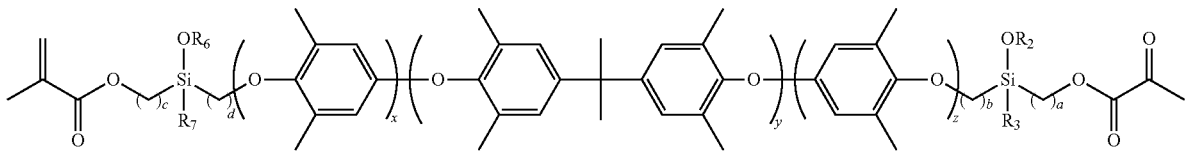

where a and c can each be independently 0 to 12; b and d are each independently 0 to 12, x and z can each independently be 0 to 30, provided that the sum of x and z is at least 2 and y can be 0 or 1. $R^2$ and $R^6$ can each independently be a H, a substituted hydrocarbyl group, or unsubstituted hydrocarbyl group, or any combination thereof. Non-limiting examples of $R^2$ and $R^6$ include methyl, ethyl, and propyl or combinations thereof. $R^3$ and $R^7$ can each independently be a H, a substituted hydrocarbyl group, or unsubstituted hydrocarbyl group, a substituted alkoxy group, an unsubstituted alkoxy group, or combinations thereof. Non-limiting examples of $R^3$ and $R^7$ include methoxy, ethoxy, and combinations thereof.

In another instance, $R^5$ is a vinyl group, c and d is 0, $R^6$ is methyl, and $R^7$ is methoxy. Such a compound can have the structure of

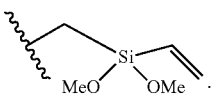

In another instance, the silane modified PPE can have the following general structure:

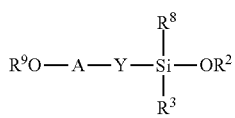

where A can be one of the polyphenylene ether moieties described above. Y can be a linking group that includes the resin reactive functional group. Non-limiting examples of resin reactive groups include an epoxy group, a substituted epoxy group, an olefin-containing group, a substituted olefin-containing group, an acrylate group, a substituted acrylate group, a cyano group, a substituted cyano group, a hydroxy group, or any combination thereof. In some embodiments, the resin reactive group can be a hydroxy group, an acrylate group or substituted acrylate group. In a one instance, the resin reactive group is an alcohol, an epoxy group, a vinyl group, an allyl group or the like. $R^2$ can be a H, a substituted hydrocarbyl group, or unsubstituted hydrocarbyl group. Non-limiting examples of $R^2$ include methyl, ethyl, and propyl. $R^3$ and $R^8$ can each independently be a H, a substituted hydrocarbyl group, an unsubstituted hydrocarbyl group, a substituted alkoxy group, or unsubstituted alkoxy group, or combinations thereof. Non-limiting examples of $R^3$ and $R^8$ include methoxy, ethoxy or combinations thereof. $R^9$ can be a H, or a substituted or unsubstituted hydrocarbyl group. In some instances, $R^9$ can be a substituted or unsubstituted aromatic group. In certain instances, $R^9$ can have the structure of:

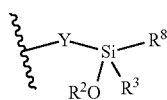

where Y is linking group that includes a resin reactive functional group $R^{10}$. $R^2$, $R^3$, and $R^8$ are as defined above. In some instances, Y can have the structure of

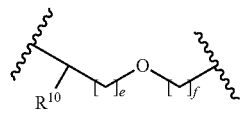

where $R^{10}$ can be the resin reactive group, e can be from 0 to 12, f can from 0 to 12, and

represents the bonds to Si and a PPE as described in the specification. In a preferred instance $R^{10}$ is not OH. In another instance, a non-limiting example of $R^9$ can be when $R^{10}$ is OH, e is 0, f is 3 and the Si is Si(OEt)$_3$. This is as shown in the following structure:

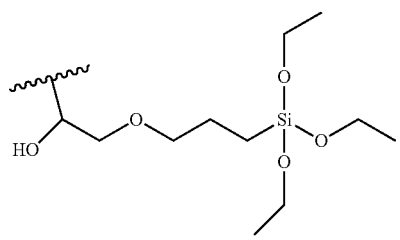 [SMILES: *C(O)COCCC[Si](OCC)(OCC)OCC]

In another instance, Y can have the structure of

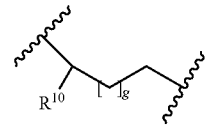

where $R^{10}$ can be the resin reactive group; g can be from 0 to 12, and

represents the bonds to Si and PPE as described in the Specification. A non-limiting example of $R^9$ can be when $R^{10}$ is OH, g is 3, and the Si is Si(OEt)$_3$. This is as shown in the follow structure

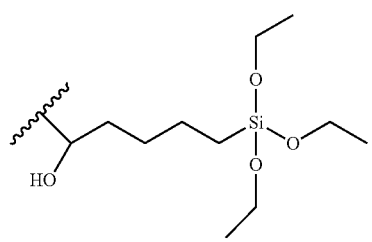

In another instance, Y can have the structure of

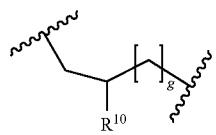

A non-limiting example of $R^9$ can be when $R^{10}$ is a vinyl group and g is 0.

In yet another instance, Y can have the structure of

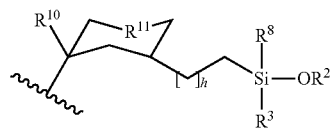

where $R^{10}$ can be the resin reactive group, h can be from 0 to 12, $R^{11}$ can be a bond, or a substituted or unsubstituted hydrocarbyl group; and

represents the bond to PPE as described in the Specification. Non-limiting examples of $R^9$ can be when $R^{10}$ is OH, $R^{11}$ is a CH$_2$, h is 0, and the Si is Si(OMe)$_3$ or Si(OEt)$_3$. This is illustrated in the following structures.

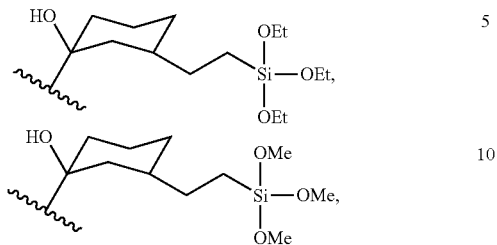

Non-limiting examples of the Si-modified PPE are illustrated as follows.

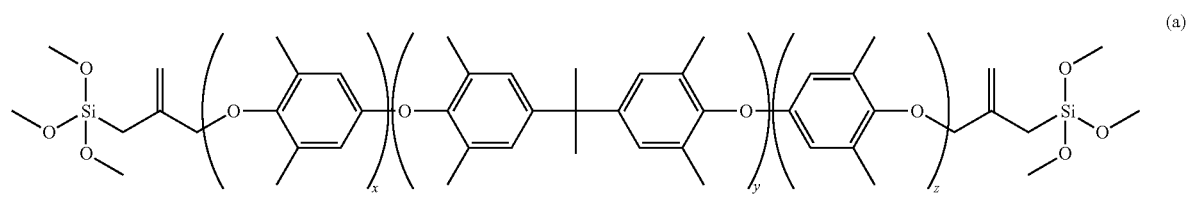

(a)

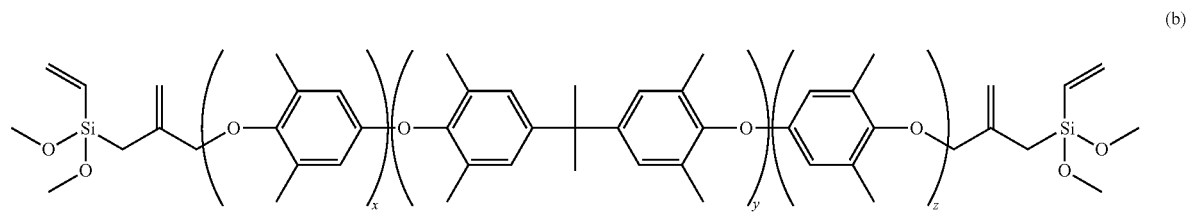

(b)

where x is 0 to 40, y is 1 and z is 0 to 40.

In some embodiments, the silane moiety is attached to the hydrocarbon portion (e.g., aromatic group) of the PPE oligomer. This allows for the hydroxyl group of the PPE polymer to become the resin reactive group. Non-limiting examples of silane groups that can be attached to the aromatic portion of the PPE oligomer are silane sane/or siloxanes that include secondary amines. A non-limiting example of an amine silane modified PPE can be

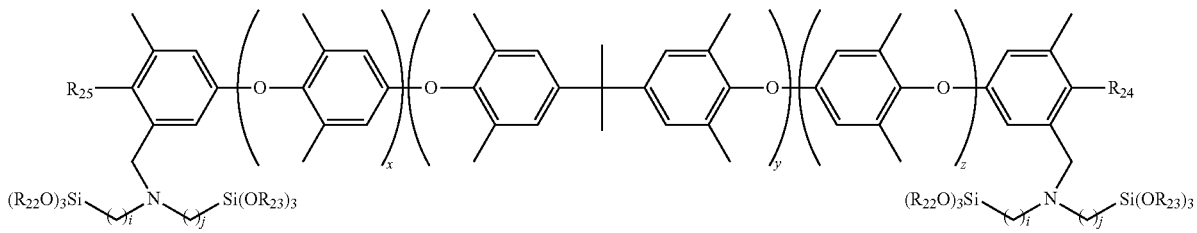

where $R^{22}$ and $R^{23}$ can each independently be a hydrocarbyl or substituted hydrocarbyl group, preferably methyl or ethyl groups, $R^{24}$ and $R^{25}$ can each independently be an epoxy group, a substituted epoxy group, an olefin-containing group, a substituted olefin-containing group, an acrylate group, a substituted acrylate group, a cyano group, a substituted cyano group, a cyanate group a hydroxy group, or any combination thereof, preferably a hydroxy group, an acrylate group or substituted acrylate group, more preferably a methacrylate group, a vinyl group or a hydroxy group, i is 0 to 6 and j is 0 to 6, x and z are independently 0 to 30, provided that the sum of x and z is at least 2 and y is 0 or 1.

In some aspects, the compatibilizing material can have the structure of:

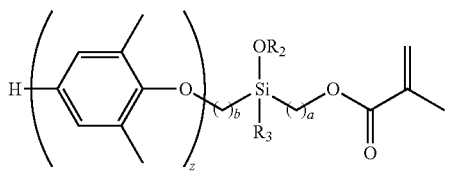

where, and $R^2$ can be a H, a substituted or unsubstituted hydrocarbyl group, $R^3$ can be a H, a substituted or unsubstituted hydrocarbyl group, or a substituted or unsubstituted alkoxy group, a can be 0 to 12, b can be 0 to 12 and z can be 1 to 30.

In some embodiments, the compatibilizing material can have the structure of

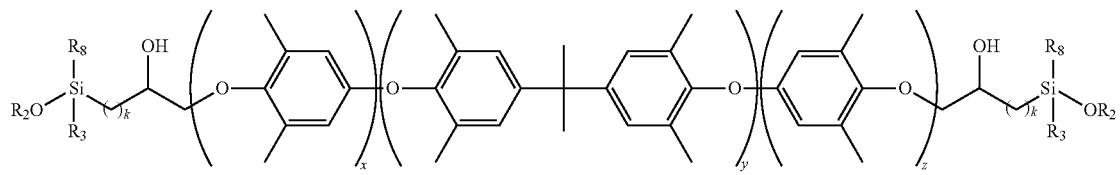

where k can be 1 to 10, x and, z can be independently 0 to 40, y can be 0 or 1, wherein when y is 0, at least one of x and z is 1 to 40, $R^2$ can be a H, a substituted or unsubstituted hydrocarbyl group, and $R^3$ and $R^8$ can each independently be a H, a substituted or unsubstituted hydrocarbyl group, or a substituted or unsubstituted alkoxy group.

In some embodiments, the compatibilizing material can have the structure of

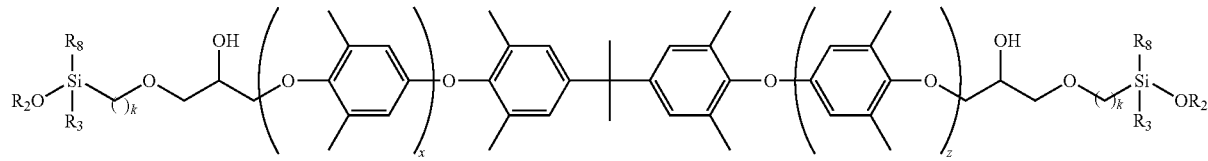

where k can be 1 to 10, x and, z can be independently 0 to 40, R2 can be a H, a substituted or unsubstituted hydrocarbyl group, and R3 and R8 can each independently be a H, a substituted or unsubstituted hydrocarbyl group, or a substituted or unsubstituted alkoxy group.

In some aspects, the compatibilizing material can have the structure of:

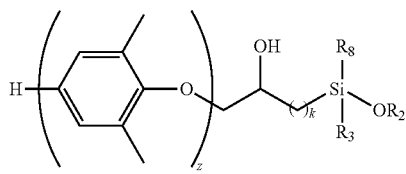

where k can be 1 to 10, z can be 1 to 40, $R^2$ can be a H, a substituted or unsubstituted hydrocarbyl group, and $R^3$ and $R^8$ can each independently be a H, a substituted or unsubstituted hydrocarbyl group, or a substituted or unsubstituted alkoxy group.

In some aspects, the compatibilizing material can have the structure of:

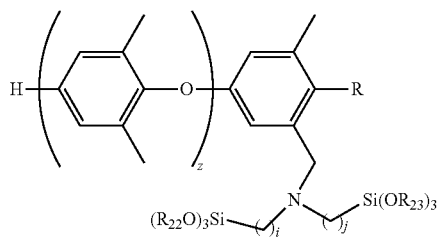

where $R^{22}$ and $R^{23}$ can each independently be a hydrocarbyl or substituted hydrocarbyl group, preferably methyl or ethyl groups, R can be an epoxy group, a substituted epoxy group, an olefin-containing group, a substituted olefin-containing group, an acrylate group, a substituted acrylate group, a cyano group, a substituted cyano group, a cyanate group a hydroxy group, or any combination thereof, preferably a hydroxy group, an acrylate group or substituted acrylate group, more preferably a methacrylate group, a vinyl group or a hydroxy group, i is 0 to 6 and j is 0 to 6, z can be 1 to 30.

B. Preparation of Si Modified PPE Compatibilizing Material

Si modified PPEs can be prepared using known organic synthesis methodology. Mono- and bifunctional PPE oligomers and silane precursors can be obtained from commercial sources and/or prepared using synthetic methodology. Commercial sources of PPE oligomers can include SABIC (Saudi Arabia). Silane precursors can be obtained from commercial sources such as Gelest (USA). Non-limiting examples of silane precursors include the following structures.

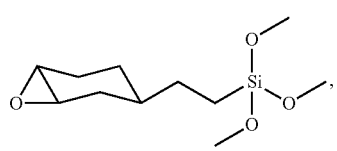

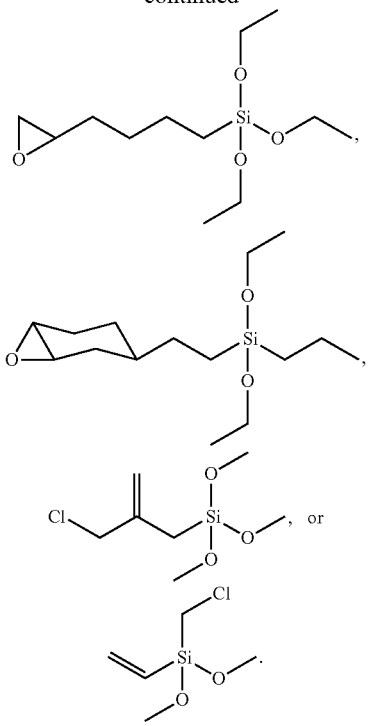

Secondary amino functionalized silane materials can also be used. Non-limiting examples, of amine-functionalized silanes include bis(3-trimethoxysilylpropyl)amine (aminoethylaminomethyl)phenethyltrimethoxysilane, N-(2-Aminoethyl)-3-aminopropyltrimethoxysilane, N-[3-trimethoxylsilyl)propyl]ethylene diamine available from Gelest (USA), and those described in European Patent No. 1451198 to Gedon et al., preferably bis(3-trimethoxysilylpropyl)amine. A non-limiting example of an amine functionalized silane can include

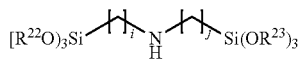

where $R^{21}$ and $R^{22}$ can each independently be a hydrocarbyl or substituted hydrocarbyl group, preferably methyl or ethyl groups, i is 0 to ___ and j is 0 to 6. In a preferred aspect, $R^{22}$ and $R^{23}$ are both methyl and i and j are 3.

Preparation of the compatibilizing materials of the present invention can include preparing a solution of mono- or bifunctional PPE oligomer (PPE oligomer) and organic solvent. The PPE oligomer solution can be heated to a temperature of 40° C. to 60° C., 45° C. to 55° C., or at least one or, equal to one of, or between any two of 40, 41, 42, 43, 44, 45, 46, 47, 48, 49, 50, 51, 52, 53, 54, 55, 56, 57, 58, 59 and 60° C. until the PPE oligomer dissolves.

Non-limiting examples of organic solvents include aromatic hydrocarbons (e.g., benzene, toluene, and xylene), halogenated aromatic hydrocarbons (e.g., chlorobenzene and dichlorobenzene), halogenated aliphatic hydrocarbons (e.g., chloroform, trichloroethylene, and carbon tetrachloride), and aprotic polar solvents (e.g., N-methyl-2-pyrrolidone and 1,3-dimethyl-2-imidazolidinone). Next a silane precursor material described above and a catalytic base (e.g., 4-dimethylaminopyridine (DMAP)) can be added to the solution under agitation. The reactive solution can be heated to a reaction temperature of 80 to 100° C., 85 to 95° C., or at least one or, equal to one of, or between any two of 80, 81, 82, 83, 84, 85, 86, 87, 88, 89, 90, 91, 92, 93, 94, 95, 96, 97, 98, 99 and 100° C., and then stirred at the reaction temperature until the reaction is deemed complete (e.g., 1 to 24 hours). Examples of suitable basic catalysts which can be used according to the present invention include alcoholates (e.g., sodium methoxide and sodium ethoxide); tertiary amines (e.g., benzyldimethylamine, tributylamine, and 1,8-diazabicyclo[5,4,0]-7-undecene (DBU), 4-dimethylamino-pyridine (DMAP)); and alkali metal hydroxides (e.g., sodium hydroxide and potassium hydroxide). The molar ratio of silane precursor to mono- or bifunctional PPE oligomer to can be 0.5 to 2, 1.5 to 2, or 1.6 to 1.9, 1.7 to 1.8 or any value or range there between. The product can be precipitated by contact of the reaction solution with a precipitating solvent. The reaction solvent can be added to the precipitating solvent or vice-a-versa. The precipitate can isolated using known isolation techniques such as filtration, decantation, centrifugation, etc. The isolated precipitate can be dried under vacuum at room temperature (e.g., 20 to 30° C., or about 25° C.).

In some embodiments, the amine silane functional group is coupled to the PPE polymer. Amine silane functionalized PPE can be prepared in the following manner. A solution of organic solvent (e.g., toluene) and PPE precursor materials (e.g., dimethyl phenyl, tetramethyl bisphenol A), amines (e.g., N,N-dimethylbutylamine, di-tert-butylethylenediamine N,N,N'N'-didecyldimethyl ammonium chloride and catalyst solution (e.g., $Cu_2O$ and HBr) can be polymerized under an oxygen atmosphere at a temperature of 30 to 50° C. or any value there between or about 40° C. After a desired amount of time (e.g., 1 to 1.5 hours or about 1.3 hours), the temperature can be increased to 45 to 50° C. or about 48° C. and held for a desired amount of time (e.g., 10 minutes). After holding, a secondary amine silane (e.g. bis(3-trimethoxysilylpropyl)amine can be added to the reaction mixture. The reaction can be continued under an oxygen atmosphere (e.g., an oxygen flow) for a desired amount of time or until the reaction was deemed complete (e.g., 150 minutes). The oxygen source can be discontinued and a quenching agent (nitrilotriacetic acid trisodium salt) and water (e.g., de-ionized water) can be added to the reaction mixture. The resulting mixture can be heated to 60° C. and held for a desired amount of time (e.g., 120 minutes). The layered reaction mixture can be separated by centrifugation and the final oligomer can be isolated by precipitating the toluene phase into methanol followed by filtration and drying in a vacuum oven at 60° C. under nitrogen overnight.
C. Preparation of Materials that Include the Compatibilizing Material The compatibilizing material of the present invention can be contacted with fibrous material to form a protective coating on at least a portion of the surface or the entire surface of the fibrous material. Non-limiting examples of fibrous materials include glass fibers, carbon fibers, aramid fibers, polyethylene fibers, polyester fibers, polyamide fibers, ceramic fibers, basalt fibers, steel fibers, and/or the like. Fibers can be provided in bundles (e.g., bundles of carbon, ceramic, carbon precursor, ceramic precursor, glass, and/or the like fibers). Such bundles may include any number of fibers, such as, for example, 400, 750, 800, 1,375, 1,000, 1,500, 3,000, 6,000, 12,000, 24,000, 50,000, 60,000, or more fibers. Fibers in a bundle can have an average filament diameter of 5, 6, 7, 8, 9, 10, 11, 12, 13, 14, 15, 16, 17, 18, 19, 20, 21, 22, 23, 24, 25, or more microns (e.g., from 5 to 30 microns, 10 to 20 microns, 12 to 15 microns, or any range there between). The fibers can be long (e.g., have a high aspect ratio). Aspect ratios can be from 2 to 10 or 10 to 500, or any value there between. Fibers can also be provided as a woven mat or cloth. In some instances, glass fibers, glass cloth, or both, are preferred. The fibrous material can be completely or partially coated. Contacting the fibrous material can include (1) immersing the fibrous material in a solution of the Si modified PPE, (2) removing and drying the fibrous material, and (3) drying the fibrous material. The solution with which the fibers are coated can contain from about 1 to 25 percent, by weight, of the Si modified PPE. Any solvent may be employed, preferably solvents that are non-reactive with the fibers and/or polymers to which the fibers can be incorporated into to produce composite materials. Non-limiting examples of solvents include methyl ethyl ketone, tetrahydrofuran and mixtures thereof. Drying of the fibers after removal from the solution may take place in air at ambient or elevated temperatures.

The Si modified PPE coated fibrous material can be combined with one or more resins. The fibrous material can be in any shape or form. Contact of the Si modified PPE coated fibrous materials with a resin can covalently bond the polymeric resin to the Si modified PPE. Contact can include mixing the above-described components by kneading in various kneading machines (e.g., a single-screw extruder, a twin-screw extruder, a Banbury mixer, and the like), or by mixing solutions or suspensions of each component and removing the solvent (or adding a common non-solvent) to form a precipitate, followed by collection by filtration. The components can be mixed in any of known allowable orders. Where a melt-kneading method is used, components are preferably mixed successively in descending order of viscosity of each component added. During contact, the reactive group of the Si modified PPE can covalently bond to a reactive group of the resin.

Fiber-containing composites of the present invention can also be made by dispersing fibers in a polymer matrix as described in International Application Publication No. WO 2016/142786 to Prins et al., which is incorporated by reference in its entirety. In such a method, a sheet or film that includes thermoplastic polymer matrix and additive can be supplied between a first and a second spreaded fiber layers. Heat can be applied to the fiber layer/polymer composition/fiber layer material, followed by pressing the fiber layers into the polymer composition. In some embodiments, after pressing is completed, the first or second fiber layers can be rubbed. In some embodiments, the fibers are not spread prior to heating. In another embodiment, the fiber-containing composite can be made by using known impregnation techniques. For example, Miller et al. in Polymers & Polymer Composites, 1996, Vol. 4, No. 7 describes impregnation techniques for thermoplastic matrix composites, which is incorporated by reference in its entirety. One such method can include providing supplying fibers to one or more solution baths (e.g., thermoplastic polymer in one or two baths) to form resin impregnated fibers, drying the fibers, and then pressing the fibers to produce a fiber-containing composite (e.g., prepreg sheets). In another embodiment, the polymer and fibers can be stacked together, heated, and then pressed causing the resin to flow transverse to the fibers to from prepreg sheets of fiber-containing composites. In a preferred embodiment, the fiber-containing composite is a unidirectional tape.

Also disclosed are laminates including fiber-containing composites of the present disclosure. Such laminates can include 2, 3, 4, 5, 6, 7, 8, 9, 10, or more plies where at least one ply is a fiber-containing composite of the present disclosure. In some laminates, at least two plies are positioned such that their respective fibers are substantially parallel to a first axis. In some laminates, at least two plies are positioned such that their respective fibers are not parallel to each other. Fiber-containing composites and laminates of the present disclosure can be assembled or processed into two-dimensional or three-dimensional structures, such as, for example, via winding and/or lay-up techniques.

D. Articles of Manufacture

Non-limiting examples of resins include a thermoset polymer, a thermoplastic polymer, a fire-retardant resin composition, or any combination thereof. Thermoset polymers can include an epoxy resin, an epoxy vinylester, an alkyd, an amino-based polymers a diallyl phthalate, a phenolics polymer or resin, a polyester, an unsaturated polyester resin, a dicyclopentadiene, a polyimide, a silicon, a cyanate esters of polycyanurate, a thermosetting polyacrylic resin, a benzoxazine, or co-polymers thereof, or blends thereof.

Non-limiting examples of thermoplastic polymers include polyethylene terephthalate (PET), a polycarbonate (PC) family of polymers, polybutylene terephthalate (PBT), poly (1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly (cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), co-polymers thereof, or blends thereof.

The resin can include additives Non-limiting examples of additives include coupling agents, antioxidants, heat stabilizers, flow modifiers, colorants, slip agents, weathering agents, nucleating agents, etc., or any combinations thereof.

The composite material comprising resin and compatibilized fibrous materials can have a fiber content, based on the total weight of the composite, of 1 to 90 wt. % fibers or greater than or substantially equal to any one of, or between any two of: 1, 5, 10, 15, 20, 25, 30, 35, 40, 45, 50, 55, 60, 65, 70, 75, 80, 85, or 90 wt. % fibers. The resin content of the composite material can be, based on the total weight of the composite, 10 to 99 wt. % resin or greater than or substantially equal to any one of, or between any two of: 10, 15, 20, 25, 30, 35, 40, 45, 50, 55, 60, 65, 70, 75, 80, 85, 90, 95, or 99 wt. % fibers.

The fibers and composites having resin and the sized fibers can be used to make a variety of articles of manufacture. Non-limiting examples of such articles of manufacture include automotive parts (e.g., doors, hoods, bumpers, A-beams, B-beams, battery casings, bodies in white, reinforcements, cross beams, seat structures, suspension components, hoses, and/or the like), braided structures, woven structures, filament wound structures (e.g., pipes, pressure vessels, and/or the like), aircraft parts (e.g., wings, bodies, tails, stabilizers, and/or the like), wind turbine blades, boat hulls, boat decks, transportation components, rail cars, rail car parts, sporting goods, window lineals, pilings, docks, reinforced wood beams, retrofitted concrete structures, reinforced extrusion or injection moldings, hard disk drive (HDD) or solid state drive (SSD) casings, TV frames, smartphone mid-frames, smartphone unibody casings, tablet mid-frames, tablet unibody casings, TV stands or tables, lap-top computer casings, ropes, cables, protective apparel (e.g., cut-resistant gloves, helmets, and/or the like), armor, plates, and the like. Non-limiting examples of transportation components can include floor panels, claddings, covers, and tray tables for train interiors. Non-limiting examples of claddings include: interior vertical surfaces, such as side walls, front walls, end-walls, partitions, room dividers, flaps, boxes, hoods and louvres; interior doors and linings for internal and external doors; window insulations; kitchen interior surfaces; interior horizontal surfaces, such as ceiling paneling, flaps, boxes, hoods and louvres; luggage storage areas, such as overhead and vertical luggage racks, luggage containers and compartments; driver's desk applications, such as paneling and surfaces of driver's desk; interior surfaces of gangways, such as interior sides of gangway membranes (bellows) and interior linings; window frames (including sealants and gaskets); (folding) tables with downward facing surface; interior and exterior surface of air ducts, and devices for passenger information (such as information display screens) and the like.

The compatibilizing material described herein can be used for surface treatment and/or coating of various materials such as can be sheet, foil, fiber, film and/or fillers. The materials can include but are not limited to glass fiber, alumina fiber, basalt fiber, quartz fiber, inorganic filler or metal foil, such as Cu foil. Certain aspects of the present invention is directed to a surface treated and/or coated material containing a compatibilizing material described herein. The surface treated and/or coated material can include but are not limited to glass such as glass fiber, alumina fiber, basalt fiber, quartz fiber, inorganic filler such as silica or metal foil such as copper foil.

In the context of the present invention, at least the following 23 aspects are provided. Embodiment 1 is directed to a compatibilizing material comprising a silane (Si) modified polyphenylene ether (PPE) oligomer having a resin reactive functional group, wherein the resin reactive functional group is (1) a substituent of the PPE oligomer, (2) positioned between the PPE portion of the oligomer and the Si portion of the oligomer, (3) a substituent of the Si portion of the oligomer, or (4) a combination thereof. Embodiment 2 is directed to the compatibilizing material of embodiment 1, having the structure:

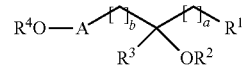

where A is the polyphenylene ether oligomer, a is 0 to 12, b is 0 to 12, $R^1$ is a resin reactive group, $R^2$ is a hydrogen (H), a substituted or unsubstituted hydrocarbyl group, $R^3$ is a H, a substituted or unsubstituted hydrocarbyl group, or a substituted or unsubstituted alkoxy group, and $R^4$ is a H, a substituted hydrocarbyl group or unsubstituted hydrocarbyl group, preferably $R^4$ is a substituted or unsubstituted aromatic group, or $R^4$ has the structure of:

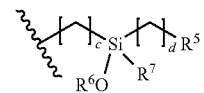

where: c is 0 to 12; d is 0 to 12; $R^5$ is a resin reactive group; $R^6$ is a H, a substituted or unsubstituted hydrocarbyl group;

and $R^7$ is a H, a substituted or unsubstituted hydrocarbyl group, or a substituted or unsubstituted alkoxy group.

Embodiment 3 is directed to the compatibilizing material of embodiment 1, having the structure:

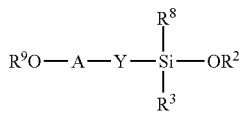

where A is the polyphenylene ether oligomer, Y is a linking group comprising the resin reactive functional group $R^{10}$; $R^2$ is a H, a substituted or unsubstituted hydrocarbyl group; $R^3$ and $R^8$ are each independently a H, a substituted or unsubstituted hydrocarbyl group, or a substituted or unsubstituted alkoxy group; and $R^9$ is a H, a substituted hydrocarbyl group or an unsubstituted hydrocarbyl group.

Embodiment 4 is directed to the compatibilizing material of embodiment 3, wherein $R^9$ is a substituted or unsubstituted aromatic group, or $R^9$ has the structure of:

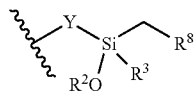

where Y is the linking group comprising a resin reactive functional group $R^{10}$; $R^2$ is a H, a substituted or unsubstituted hydrocarbyl group; and $R^3$ and $R^8$ are each independently a H, a substituted or unsubstituted hydrocarbyl group, or a substituted or unsubstituted alkoxy group.

Embodiment 5 is directed to the compatibilizing material of any one of embodiments 3 to 4, wherein Y is

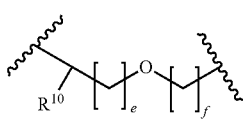

where: $R^{10}$ is the resin reactive group, e is from 0 to 12; f is from 0 to 12; and

represents the bonds to A and Si, with the proviso that when $R^9$ is H, $R^{10}$ is not OH;

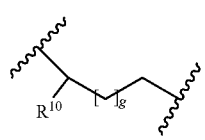

where: $R^{10}$ is the resin reactive group; g is from 0 to 12; and

represents the bonds to A and Si; or

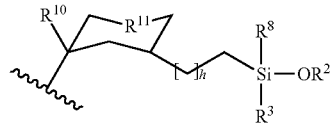

where: $R^{10}$ is the resin reactive group; h is from 0 to 12; $R^{11}$ is a bond, or a substituted or unsubstituted hydrocarbyl group; and

represents the bond to A.

Embodiment 6 is directed to the compatibilizing material of any one of embodiments 1 to 5, wherein the resin reactive group comprises an epoxy group, a substituted epoxy group, an olefin-containing group, a substituted olefin-containing group, an acrylate group, a substituted acrylate group, a cyano group, a substituted cyano group, a hydroxy group, or any combination thereof, preferably a hydroxy group, an acrylate group or substituted acrylate group, more preferably a methacrylate group, a vinyl group or a hydroxy group.

Embodiment 7 is directed to the compatibilizing material of any one of embodiments 1 to 6, wherein A comprises poly(phenylene ether).

Embodiment 8 is directed to the compatibilizing material of embodiment 7, wherein the poly(phenylene ether) has the chemical structure of

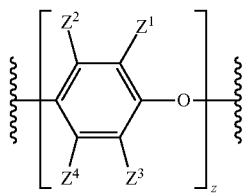

where $Z^1$, $Z^2$, $Z^3$, and $Z^4$ each independently is a hydrogen, a phenyl, a (bi)cyclic hydrocarbon, a unsubstituted or a substituted $C_1$-$C_{12}$ hydrocarbyl group provided that the hydrocarbyl group is not a tertiary hydrocarbyl, a $C_1$-$C_{12}$ hydrocarbylthio, a $C_1$-$C_{12}$ hydrocarbyloxy, or a $C_2$-$C_{12}$ halohydrocarbyloxy with at least two carbon atoms separating the halogen, and oxygen atoms, preferably $Z^1$ and $Z^3$ are methyl and $Z^2$ and $Z^4$ are H, and z is at least 1 or

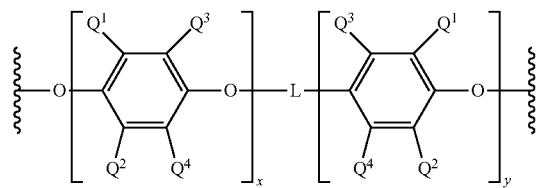

where $Q^1$, $Q^2$, $Q^3$, and $Q^4$ each independently is a halogen, an unsubstituted or substituted $C_1$-$C_{12}$ primary or secondary hydrocarbyl, a $C_1$-$C_{12}$ hydrocarbylthio, a $C_1$-$C_{12}$ hydrocarbyloxy, and a $C_2$-$C_{12}$ halohydrocarbyloxy where at least two carbon atoms separate the halogen and oxygen atoms, x and y are independently 0 to 30, provided that the sum of x and y is at least 2; and L has the chemical structure:

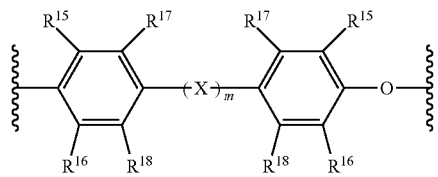

where $R^{15}$, $R^{16}$, $R^{17}$, and $R^{18}$ are each independently is a hydrogen, an unsubstituted or substituted $C_1$-$C_{12}$ hydrocarbyl provided that the hydrocarbyl group is not a tertiary hydrocarbyl, a $C_1$-$C_{12}$ hydrocarbylthio, a $C_1$-$C_{12}$ hydrocarbyloxy, and a $C_2$-$C_{12}$ halohydrocarbyloxy with at least two carbon atoms separating the halogen and oxygen atoms; m is 0 or 1; and X has the chemical structure selected from the group

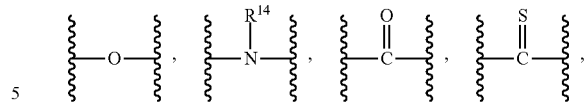

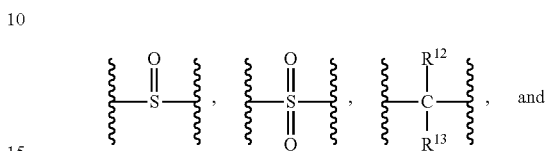

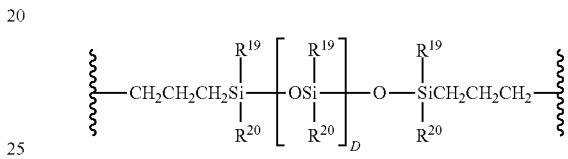

where $R^{14}$ is a hydrogen or $C_1$-$C_{12}$ hydrocarbyl, $R^{12}$ and $R^{13}$ each independently is a hydrogen, a $C_1$-$C_{12}$ hydrocarbyl, or $C_1$-$C_6$ hydrocarbylene where $R^{12}$ and $R^{13}$ collectively can form a $C_4$-$C_{12}$ alkene, or a siloxane where $R^{19}$ and $R^{20}$ are each independently selected from hydrogen, hydrocarbyl or halogen-substituted hydrocarbyl, D is an integer of from about 30 to about 70, preferably $R^{19}$ and $R^{20}$ are both methyl and D is 40 to 60, and at least one of $R^{15}$-$R^{18}$ is methoxy.

Embodiment 9 is directed to the compatibilizing material of embodiment 8, having the structure of

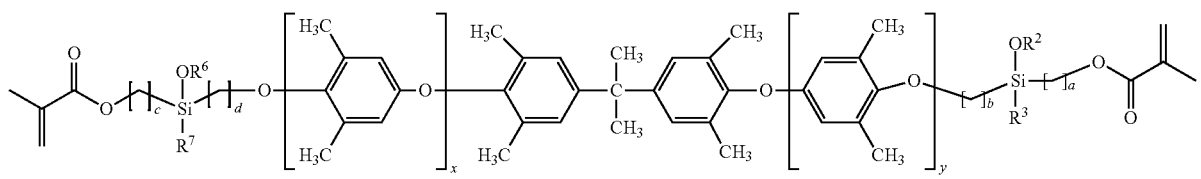

where: a and c are each independently 0 to 12; b and d are each independently 0 to 12; and $R^2$ and $R^6$ are each independently a H, a substituted or unsubstituted hydrocarbyl group; $R^3$ and $R^7$ are each independently a H, a substituted or unsubstituted hydrocarbyl group, or a substituted or unsubstituted alkoxy group; and x and y are independently 0 to 30, provided that the sum of x and y is at least 2;

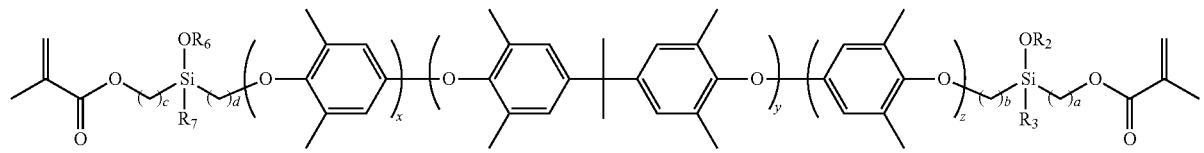

where: a and c are each independently 0 to 12; b and d are each independently 0 to 12; and $R^2$ and $R^6$ are each independently a H, a substituted or unsubstituted hydrocarbyl group; $R^3$ and $R^7$ are each independently a H, a substituted or unsubstituted hydrocarbyl group, or a substituted or unsubstituted alkoxy group; x and z are independently 0 to 30, provided that the sum of x and z is at least 2 and y is 0 or 1;

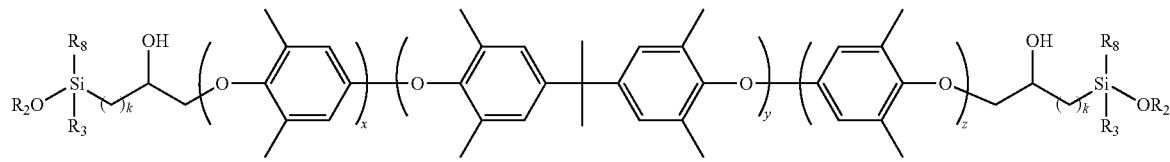

where k is 1 to 10, x and, z are independently 0 to 40, y is 0 or 1, wherein when y is 0, at least one of x and z is 1 to 40, $R^2$ is a H, a substituted or unsubstituted hydrocarbyl group, and $R^3$ and $R^8$ each independently is a H, a substituted or unsubstituted hydrocarbyl group, or a substituted or unsubstituted alkoxy group;

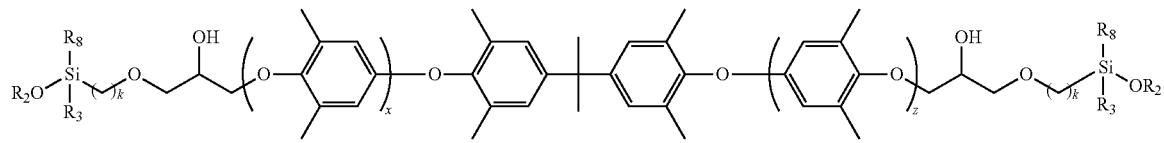

where k is 1 to 10, x and, z are independently 0 to 40, y is 0 or 1, wherein when y is 0, at least one of x and z is 1 to 40, $R^2$ is a H, a substituted or unsubstituted hydrocarbyl group, and $R^3$ and $R^8$ each independently is a H, a substituted or unsubstituted hydrocarbyl group, or a substituted or unsubstituted alkoxy group; or

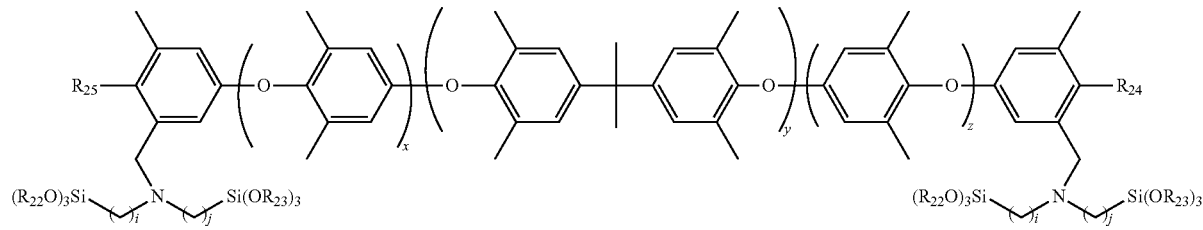

where $R^{22}$ and $R^{23}$ each independently is a hydrocarbyl or substituted hydrocarbyl group, preferably methyl or ethyl groups, $R^{24}$ and $R^{25}$ each independently is an epoxy group, a substituted epoxy group, an olefin-containing group, a substituted olefin-containing group, an acrylate group, a substituted acrylate group, a cyano group, a substituted cyano group, a cyanate group a hydroxy group, or any combination thereof, preferably a hydroxy group, an acrylate group or substituted acrylate group, more preferably a methacrylate group, a vinyl group or a hydroxy group, i is 0 to 6 and j is 0 to 6, x and z are independently 0 to 30, provided that the sum of x and z is at least 2 and y is 0 or 1.

Embodiment 10 is directed to a compatibilizing material, having the structure of

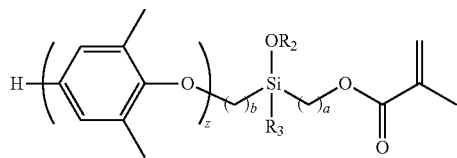

where, and R2 is H, a substituted or unsubstituted hydrocarbyl group, R3 is a H, a substituted or unsubstituted hydrocarbyl group, or a substituted or unsubstituted alkoxy group, a is 0 to 12, b is 0 to 12 and z is 1 to 30;

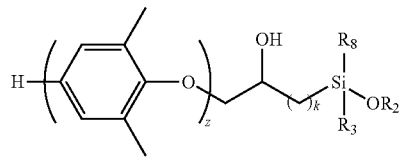

where k is 1 to 10, z is 1 to 40, $R^2$ is H, a substituted or unsubstituted hydrocarbyl group, and $R^3$ and $R^8$ each independently is a H, a substituted or unsubstituted hydrocarbyl group, or a substituted or unsubstituted alkoxy group; or

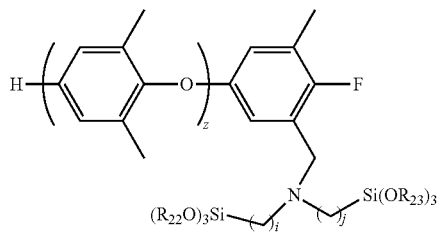

where $R^{22}$ and $R^{23}$ each independently is a hydrocarbyl or substituted hydrocarbyl group, preferably methyl or ethyl groups, R is an epoxy group, a substituted epoxy group, an olefin-containing group, a substituted olefin-containing group, an acrylate group, a substituted acrylate group, a cyano group, a substituted cyano group, a cyanate group a hydroxy group, or any combination thereof, preferably a hydroxy group, an acrylate group or substituted acrylate group, more preferably a methacrylate group, a vinyl group or a hydroxy group, i is 0 to 6 and j is 0 to 6, and z is 1 to 30.

Embodiment 11 is directed a surface treated material and/or a coated material comprising the compatibilizing material of any one of embodiments 1 to 10.

Embodiment 12 is directed a surface treated material and/or a coated material wherein a surface of the material is treated or coated with the compatibilizing material of any one of claims 1 to 10.

Embodiment 13 is directed to the surface treated material and/or coated material of embodiment 11 or 12, wherein the surface treated material and/or coated material is a glass fiber, alumina fiber, basalt fiber, quartz fiber, inorganic filler or metal foil.

Embodiment 14 is directed to the surface treated material and/or a coated material of embodiment 13, wherein the metal foil is copper (Cu) foil.

Embodiment 15 is directed to a thermosetting resin composition comprising the surface treated material and/or coated material of any one embodiments 11 to 14.

Embodiment 16 is directed to a thermosetting resin composition comprising the compatibilizing material of any one of embodiments 1 to 10 and a glass fiber, alumina fiber, basalt fiber, quartz fiber, inorganic filler or metal foil.

Embodiment 17 is directed to a sized fiber comprising the compatibilizing material of any one of embodiments 1 to 10.

Embodiment 18 is directed to the sized fiber of embodiment 17, comprised in a polymeric composition comprising a polymeric resin and optional additives.

Embodiment 19 is directed to the sized fiber of embodiment 18, wherein a least a portion of the compatibilizing material is attached to the polymeric resin and the sized fiber, preferably the compatibilizing material is covalently bonded to the polymeric resin and coated on at least a portion of the surface of the sized fiber, preferably, wherein the fiber is preferably an inorganic fiber or filler, more preferably glass fibers, glass cloth, or both.

Embodiment 20 is directed to the sized fiber of any one of embodiments 17 to 19 wherein the resin comprises a thermoset polymer, a thermoplastic polymer, a fire-retardant resin composition, or any combination thereof, preferably the thermoset polymer is an epoxy resin, an epoxy vinylester, an alkyd, an amino-based polymers a diallyl phthalate, a phenolics polymer or resin, a polyester, an unsaturated polyester resin, a dicyclopentadiene, a polyimide, a silicon, a cyanate esters of polycyanurate, a thermosetting polyacrylic resin, a benzoxazine, or co-polymers thereof, triallyl isocyanaurate, triallyl cyanurate, and other mono-, di- and multifunctional vinyl monomers or crosslinking agents or blends thereof.

Embodiment 21 is directed to the sized fiber of any one of embodiments 17 to 20, wherein the sized fiber is comprised in a laminate.

Embodiment 22 is directed to an article of manufacture comprising the sized fiber surface treated material and/or a coated material, and/or thermosetting resin composition of any one of embodiments 11 to 21.

Embodiment 23 is directed to a method of preparing a silane modified polyphenylene ether (PPE), the method comprising contacting a composition comprising a PPE oligomer, a silane source, and 4-dimethylaminopyridine under conditions sufficient, preferably a temperature of 80 to 100° C., to react the PPE oligomer with the silane source to produce a silane modified PPE.

Embodiment 24 is directed to a method of preparing a silane modified polyphenylene ether (PPE), the method comprising contacting 2,6-dimethyl phenol and silane source under conditions sufficient, to react 2,6-dimethyl phenol with the silane source to produce a silane modified PPE.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Synthesis of Si Modified Bifunctional PPE-Hydroxyl

Bifunctional PPE oligomer (20, g SA90 pellets, 1720 g/mol, Compound I) was dissolved in toluene (30 g) at 50° C. in a three-necked round bottom flask equipped with a condenser. After all PPE oligomer was dissolved, 3-glycidoxypropyltrimethoxysilane (GPTMS) (Compound II, 6.12 g) and 4-dimethylaminopyridine (DMAP, 0.3 g) were added to the oligomer solution in toluene while stirring. After addition, the temperature of the solution was increased to 90° C., and then reaction mixture was stirred for 10 hours at 90° C. The compatibilizing material of the present invention (Compound III) was isolated by precipitating the toluene solution into methanol followed by filtration and drying in vacuum oven at room temperature. The Si modified PPE included a hydroxy group as the resin reactive group.

Final structure of silane functionalized PPE oligomer (PPE-AES) of the present invention was confirmed by solution $^1$H-NMR and $^{31}$P-NMR spectroscopy. All NMR spectra were acquired on an Agilent Technology instrument operating at an observe frequency of 600 MHz in d-chloroform. In the NMR spectra of PPE-AES, disappearance of peaks correspond to aromatic end group protons and terminal phenolic protons of PPE oligomer as well as formation of new peaks correspond to newly formed methylene group protons, which was attached to the end groups of PPE oligomers, and peaks correspond to methoxy silane protons confirmed structure of PPE-AES.

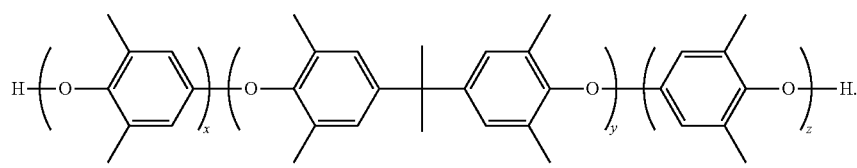

Compound I

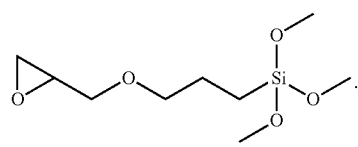

Comopund II

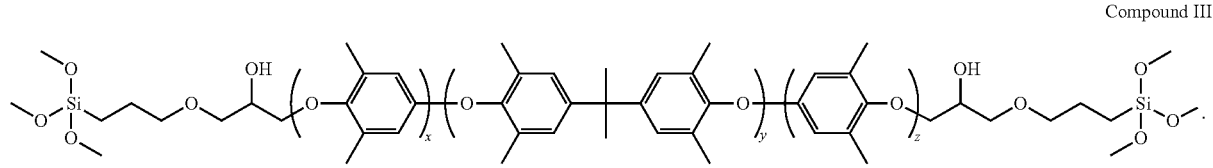

Compound III

Example 2

Synthesis of Amino-Siloxane Functionalized Modified PPE

Table I lists the names and supplier of the ingredients. Toluene (223.8 g), DMP (99.4 g), TMBPA (21.1 g), DMBA (2.24 g), and a mixture of DBEDA (0.65 g), N,N,N'N'-didecyldimethyl ammonium chloride (0.35 g), and toluene (1.17 g) were charged to a bubbling polymerization vessel (500 mL) and stirred under nitrogen. Catalyst solution (1.45 g of 0.106 g $Cu_2O$ and 1.34 g (48%) HBr) was added to the reaction mixture. After the addition of catalyst solution, oxygen flow was started. The temperature was ramped from 25° C. to 40° C. in 15 minutes, and at $80^{th}$ minute of the reaction, it was increased to 48° C. At the $90^{th}$ minute of the reaction, bis(3-trimethoxysilylpropyl)amine (3.62 g) was added to the reactor. Oxygen flow was maintained for 150 minutes, at which point the flow was stopped, and NTA (8.0 g) and DI water (4.0 g) were added to the reaction mixture. The resulting mixture was stirred at 60° C. for 120 minutes. The layers were then separated by centrifugation and the final oligomer was isolated by precipitating the toluene phase into methanol followed by filtration and drying in a vacuum oven at 60° C. under nitrogen overnight.

TABLE 1

| Acronym | Name | CAS# | Supplier |
|---|---|---|---|
| DMP | 2,6 Xylenol | 576-26-1 | Sigma-Aldrich |
| TMBPA | Tetramethyl bisphenol A | 5613-46-7 | Deepak Novachem |
| TMSA | Bis(3-trimethoxy-silylpropyl)amine | 82985-35-1 | Gelest Inc. |
| $Cu_2O$ | Cuprous oxide | 1317-39-1 | American Chemet Corporation |
| HBr | Hydrobromic acid | 10035-10-6 | Chemtura Corporation |
| DBEDA | Di-tert-butylethyl-enediamine | 4062-60-6 | Achiewell LCC |
| DMBA | N,N-Dimethylbutylamine | 927-62-8 | Achiewell LCC |
| Maquat ® | N,N,N'N'-didecyldimethyl ammonium chloride | 7173-51-5 | Mason Chemical Company |
| NTA | Nitrilotriacetic acid trisodium salt | 5064-31-3 | Akzo Nobel Functional Chemicals LLC |
| Toluene | — | 108-88-3 | Fisher Scientific |
| Methanol | — | 67-56-1 | Fisher Scientific |

Example 3

Synthesis of Compound IV

Toluene (223.8 g), DMP (120.6 g), DMBA (2.24 g), and a mixture of DBEDA (0.65 g), N,N,N'N'-didecyldimethyl ammonium chloride (0.35 g), and toluene (1.17 g) can be charged to a bubbling polymerization vessel (500 mL) and stirred under nitrogen. Catalyst solution (1.45 g of 0.106 g $Cu_2O$ and 1.34 g (48%) HBr) can be added to the reaction mixture. After the addition of catalyst solution, oxygen flow can be started. The temperature can be ramped from 25° C. to 40° C. in 15 minutes, and at 80th minute of the reaction, it can be increased to 48° C. At the 90th minute of the reaction, bis(3-trimethoxysilylpropyl)amine (3.62 g) can be added to the reactor. Oxygen flow can be maintained for 150 minutes, at which point the flow can be stopped, and NTA (8.0 g) and DI water (4.0 g) can be added to the reaction mixture. The resulting mixture can be stirred at 60° C. for 120 minutes. The layers can then be separated by centrifugation and the final oligomer (compound IV) can be isolated by precipitating the toluene phase into methanol followed by filtration and drying in a vacuum oven at 60° C. under nitrogen overnight.

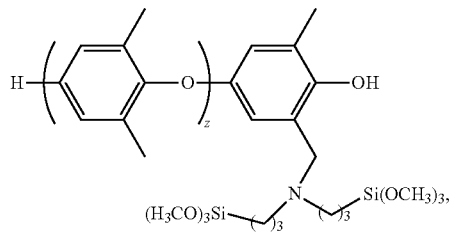

Compound IV $z = 12$

Example 4

Synthesis of Compound V

Compatibilizing material of Example 3 (compound IV) (50 g) can be dissolved in toluene (50 g) at 80° C. To this solution dimethylamino pyridine (0.5 g) can be added followed by slow addition of methacrylic anhydride (3.47 g). After addition, the temperature of the solution can be increased to 120° C., and then reaction mixture can be stirred for 4 hours. The compatibilizing material of example 4 (compound V) can be isolated by precipitating the toluene solution into methanol followed by filtration and drying in vacuum oven at room temperature.

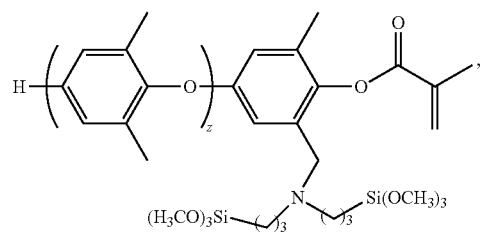

Compound V $z = 14$

Example 5

Synthesis of Compound VI

Monofunctional PPE oligomer (50 g, NORYL™ SA120 pellets, 2750 g/mol, SABIC) can be dissolved in toluene (70 g) at 50° C. in a three-necked round bottom flask equipped with a condenser. NORYL™ SA110A resin is a low molecular weight polymer based on polyphenylene ether (PPE). After all PPE oligomer is dissolved, 5,6-epoxyhexyltri-ethoxysilane (5.91 g) and 4-dimethylaminopyridine (DMAP, 0.5 g) can be added to the oligomer solution in toluene while stirring. After addition, the temperature of the solution can be increased to 90° C., and then reaction mixture can be stirred for 10 hours at 90° C. The compatibilizing material (Compound VI) can be isolated by precipitating the toluene solution into methanol followed by filtration and drying in vacuum oven at room temperature.

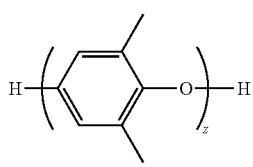

Poly(phenylene ether)

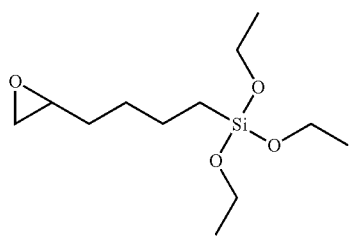 [SMILES: CCO[Si](CCCCC1CO1)(OCC)OCC]

5,6-epoxyhexyltriethoxysilane

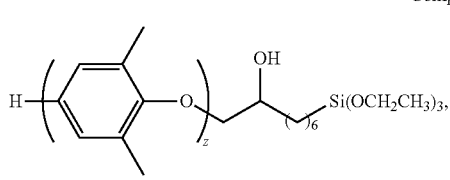

Compound VI z = 23

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A compatibilizing material comprising a silane (Si) modified polyphenylene ether (PPE) oligomer having a resin reactive functional group, wherein the resin reactive functional group is (1) a substituent of the PPE oligomer, (2) positioned between the PPE portion of the oligomer and the Si portion of the oligomer, (3) a substituent of the Si portion of the oligomer, or (4) a combination thereof;

wherein the compatibilizing material has the structure:

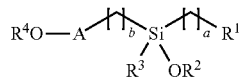

wherein A is the polyphenylene ether oligomer, a is 0 to 12, b is 0 to 12, $R^1$ is a resin reactive group, $R^2$ is a hydrogen (H), a substituted or unsubstituted hydrocarbyl group, $R^3$ is a H, a substituted or unsubstituted hydrocarbyl group, or a substituted or unsubstituted alkoxy group, and $R^4$ is a H, a substituted hydrocarbyl group, an unsubstituted hydrocarbyl group, a substituted aromatic group or an unsubstituted aromatic group; or $R^4$ has the structure of:

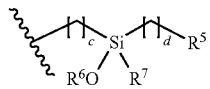

wherein c is 0 to 12; d is 0 to 12; $R^5$ is a resin reactive group; $R^6$ is a H, a substituted or unsubstituted hydrocarbyl group; and $R^7$ is a H, a substituted or unsubstituted hydrocarbyl group, or a substituted or unsubstituted alkoxy group; or wherein the compatibilizing material has the structure:

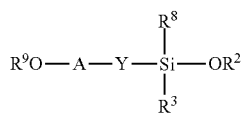

wherein A is the polyphenylene ether oligomer, Y is a linking group comprising a resin reactive functional group $R^{10}$; $R^2$ is a H, a substituted or unsubstituted hydrocarbyl group; $R^3$ and $R^8$ are each independently a H, a substituted or unsubstituted hydrocarbyl group, or a substituted or unsubstituted alkoxy group; and $R^9$ is a H, a substituted hydrocarbyl group or an unsubstituted hydrocarbyl group; wherein the resin reactive group comprises an epoxy group, a substituted epoxy group, an olefin-containing group, a substituted olefin-containing group, an acrylate group, a substituted acrylate group, a cyano group, a substituted cyano group, a hydroxy group, or any combination thereof.

2. The compatibilizing material of claim 1, wherein $R^9$ is a substituted hydrocarbyl group or an unsubstituted hydrocarbyl group.

3. The compatibilizing material of claim 2, wherein $R^9$ is a substituted or unsubstituted aromatic group, or $R^9$ has the structure of:

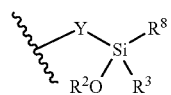

where Y is the linking group comprising the resin reactive functional group $R^{10}$; $R^2$ is a H, a substituted or unsubstituted hydrocarbyl group; and $R^3$ and $R^8$ are each independently a H, a substituted or unsubstituted hydrocarbyl group, or a substituted or unsubstituted alkoxy group.

4. The compatibilizing material of claim 1, wherein the resin reactive group comprises an acrylate group, a substituted acrylate group, a hydroxy group, a vinyl group, or any combination thereof.

5. The compatibilizing material of claim 1, wherein A comprises a poly (phenylene ether) having the chemical structure;

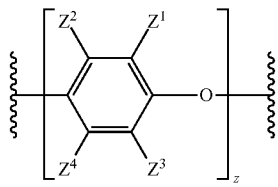

where $Z^1$, $Z^2$, $Z^3$, and $Z^4$ each independently is a hydrogen, a phenyl, a (bi) cyclic hydrocarbon, a unsubstituted or a substituted $C_1$-$C_{12}$ hydrocarbyl group provided that the hydrocarbyl group is not a tertiary hydrocarbyl, a $C_1$-$C_{12}$ hydrocarbylthio, a $C_1$-$C_{12}$ hydrocarbyloxy, or a $C_2$-$C_{12}$ halohydrocarbyloxy with at least two carbon atoms separating the halogen, and oxygen atoms, and z is at least 2; or

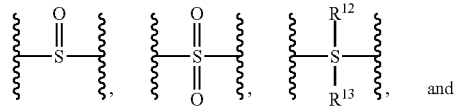

where $Q^1$, $Q^2$, $Q^3$, and $Q^4$ each independently is a halogen, an unsubstituted or substituted $C_1$-$C_{12}$ primary or secondary hydrocarbyl, a $C_1$-$C_{12}$ hydrocarbylthio, a $C_1$-$C_{12}$ hydrocarbyloxy, and a $C_2$-$C_{12}$ halohydrocarbyloxy where at least two carbon atoms separate the halogen and oxygen atoms, x and y are independently 0 to 30, provided that the sum of x and y is at least 2; and L has the chemical structure:

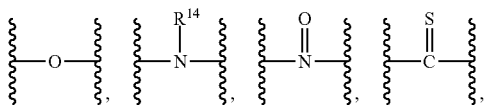

where $R^{15}$, $R^{16}$, $R^{17}$, and $R^{18}$ are each independently is a hydrogen, an unsubstituted or substituted $C_1$-$C_{12}$ hydrocarbyl provided that the hydrocarbyl group is not a tertiary hydrocarbyl, a $C_1$-$C_{12}$ hydrocarbylthio, a $C_1$-$C_{12}$ hydrocarbyloxy, and a $C_2$-$C_{12}$ halohydrocarbyloxy with at least two carbon atoms separating the halogen and oxygen atoms; m is 0 or 1; and X has the chemical structure selected from the group

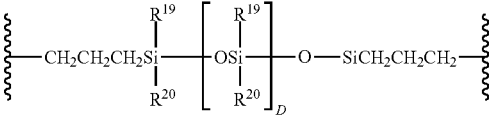

where $R^{14}$ is a hydrogen or $C_1$-$C_{12}$ hydrocarbyl, $R^{12}$ and $R^{13}$ each independently is a hydrogen, a $C_1$-$C_{12}$ hydrocarbyl, or $C_1$-$C_6$ hydrocarbylene where $R^{12}$ and $R^{13}$ collectively can form a $C_4$-$C_{12}$ alkene, or a siloxane where $R^{19}$ and $R^{20}$ are each independently selected from hydrogen, hydrocarbyl or halogen-substituted hydrocarbyl, D is an integer of from about 30 to about 70.

6. The compatibilizing material of claim 5, having the structure of

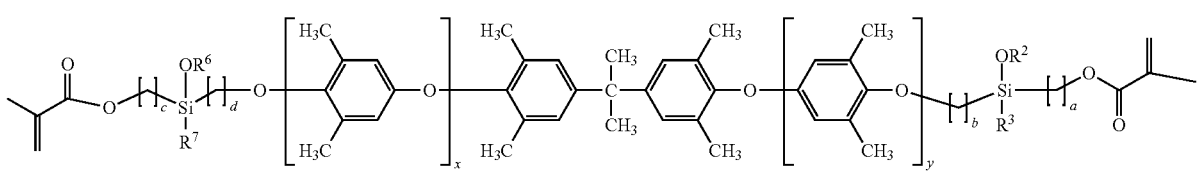

where: a and c are each independently 0 to 12; b and d are each independently 0 to 12; and $R^2$ and $R^6$ are each independently a H, a substituted or unsubstituted hydrocarbyl group; $R^3$ and $R^7$ are each independently a H, a substituted or unsubstituted hydrocarbyl group, or a substituted or unsubstituted alkoxy group; and x and y are independently 0 to 30, provided that the sum of x and y is at least 2;

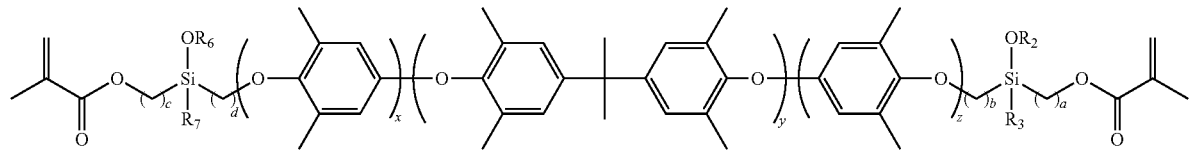

where: a and c are each independently 0 to 12; b and d are each independently 0 to 12; and $R^2$ and $R^6$ are each independently a H, a substituted or unsubstituted hydrocarbyl group; $R^3$ and $R^7$ are each independently a H, a substituted or unsubstituted hydrocarbyl group, or a substituted or unsubstituted alkoxy group; x and z are independently 0 to 30, provided that the sum of x and z is at least 2 and y is 0 or 1;

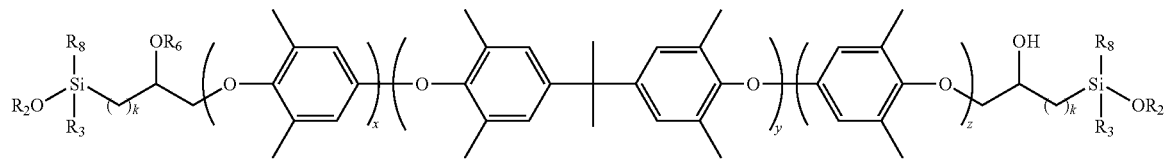

where k is 1 to 10, x and, z are independently 0 to 40, y is 0 or 1, wherein when y is 0, at least one of x and z is 1 to 40, $R^2$ is a H, a substituted or unsubstituted hydrocarbyl group, and $R^3$ and $R^8$ each independently is a H, a substituted or unsubstituted hydrocarbyl group, or a substituted or unsubstituted alkoxy group;

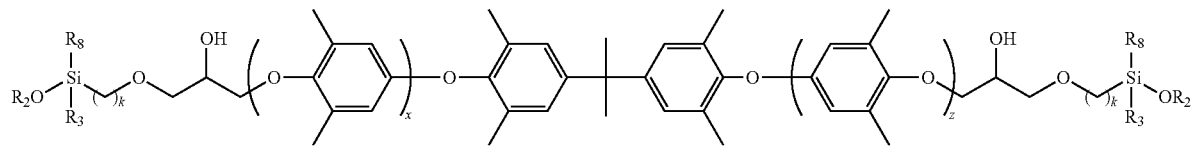

where k is 1 to 10, x and, z are independently 0 to 40, y is 0 or 1, wherein when y is 0, at least one of x and z is 2 to 40, $R^2$ is a H, a substituted or unsubstituted hydrocarbyl group, and $R^3$ and $R^8$ each independently is a H, a substituted or unsubstituted hydrocarbyl group, or a substituted or unsubstituted alkoxy group; or

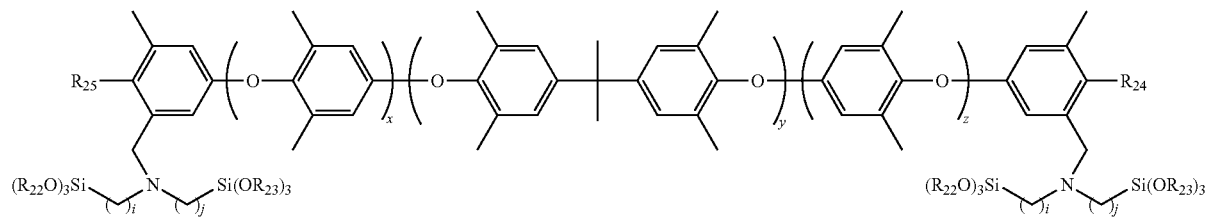

where $R^{22}$ and $R^{23}$ each independently is a hydrocarbyl or substituted hydrocarbyl group, $R^{24}$ and $R^{25}$ each independently is an epoxy group, a substituted epoxy group, an olefin-containing group, a substituted olefin-containing group, an acrylate group, a substituted acrylate group, a cyano group, a substituted cyano group, a cyanate group a hydroxy group, or any combination thereof, i is 0 to 6 and j is 0 to 6, x and z are independently 0 to 30, provided that the sum of x and z is at least 2 and y is 0 or 1.

7. A compatibilizing material, having the structure of

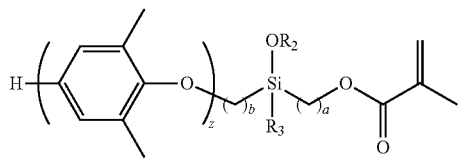

where, and $R^2$ is H, a substituted or unsubstituted hydrocarbyl group, $R^3$ is a H, a substituted or unsubstituted hydrocarbyl group, or a substituted or unsubstituted alkoxy group, a is 0 to 12, b is 0 to 12, and z is 2 to 30;

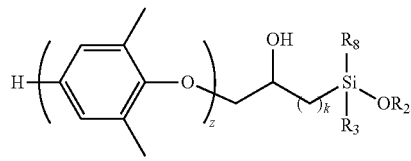

where k is 1 to 10, z is 1 to 40, $R^2$ is H, a substituted or unsubstituted hydrocarbyl group, and $R^3$ and $R^8$ each independently is a H, a substituted or unsubstituted hydrocarbyl group, or a substituted or unsubstituted alkoxy group; or

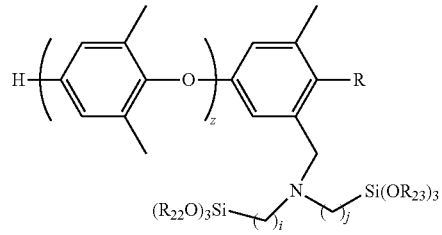

where $R^{22}$ and $R^{23}$ each independently is a hydrocarbyl or substituted hydrocarbyl group, R is an epoxy group, a substituted epoxy group, an olefin-containing group, a substituted olefin-containing group, an acrylate group, a substituted acrylate group, a cyano group, a substituted cyano group, a cyanate group a hydroxy group, or any combination thereof, i is 0 to 6 and j is 0 to 6, and z is 1 to 30.

8. A surface treated material and/or a coated material comprising the compatibilizing material of claim 1.

9. A surface treated material and/or a coated material, wherein a surface of the material is treated or coated with the compatibilizing material of claim 1.

10. A thermosetting resin composition comprising the surface treated material and/or coated material of claim 8.

11. A thermosetting resin composition comprising the compatibilizing material of claim 1 and a glass fiber, alumina fiber, basalt fiber, quartz fiber, inorganic filler or metal foil.

12. A sized fiber comprising the compatibilizing material of claim 1.

13. The sized fiber of claim 12, wherein a least a portion of the compatibilizing material is attached to a polymeric resin and the sized fiber.

14. The sized fiber of claim 13 wherein the polymeric resin comprises a thermoset polymer, a thermoplastic polymer, a fire-retardant resin composition, or any combination thereof.

15. An article of manufacture comprising a sized fiber and the surface treated material and/or the coated material of claim 8.

16. The compatibilizing material of claim 1, having the structure:

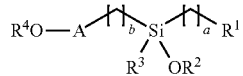

wherein $R^4$ is a substituted or unsubstituted aromatic group.

* * * * *

UNITED STATES PATENT AND TRADEMARK OFFICE
CERTIFICATE OF CORRECTION

| | | |
|---|---|---|
| PATENT NO. | : 12,180,337 B2 | Page 1 of 1 |
| APPLICATION NO. | : 17/753088 | |
| DATED | : December 31, 2024 | |
| INVENTOR(S) | : Eylem Tarkin-Tas, Huseyin Tas and Nikhil Verghese | |

It is certified that error appears in the above-identified patent and that said Letters Patent is hereby corrected as shown below:

In the Claims

<u>Claim 5, Column 45, Line 2</u>:
Replace "poly (phenylene ether)" with -- poly(phenylene ether) --.

<u>Claim 5, Column 45, Line 18</u>:
Replace "(bi) cyclic" with -- (bi)cyclic --.

Signed and Sealed this
Seventeenth Day of June, 2025

Coke Morgan Stewart
*Acting Director of the United States Patent and Trademark Office*